US008472342B1

(12) United States Patent
Bucko et al.

(10) Patent No.: US 8,472,342 B1
(45) Date of Patent: Jun. 25, 2013

(54) SYSTEMS AND METHODS OF ROUTING IP TELEPHONY DATA PACKET COMMUNICATIONS

(71) Applicant: Vonage Network, LLC, Holmdel, NJ (US)

(72) Inventors: Andrew Bucko, Old Bridge, NJ (US); Baruch Sterman, Efrat (IL)

(73) Assignee: Vonage Network, LLC, Holmdel, NJ (US)

( * ) Notice: Subject to any disclaimer, the term of this patent is extended or adjusted under 35 U.S.C. 154(b) by 0 days.

(21) Appl. No.: 13/690,994

(22) Filed: Nov. 30, 2012

(51) Int. Cl.
*H04L 12/28* (2006.01)
*H04L 12/56* (2006.01)
*H04J 3/16* (2006.01)

(52) U.S. Cl.
USPC ............ 370/252; 370/238; 370/254; 370/352

(58) Field of Classification Search
USPC ............................ 370/238–449; 709/217, 239
See application file for complete search history.

(56) References Cited

U.S. PATENT DOCUMENTS

| 3,467,780 | A  | * | 9/1969  | Buck et al. ................... 379/119 |
| 6,487,172 | B1 | * | 11/2002 | Zonoun ......................... 370/238 |
| 6,907,000 | B1 |   | 6/2005  | Host |
| 6,934,258 | B1 |   | 8/2005  | Smith et al. |
| 7,099,277 | B2 | * | 8/2006  | Sahinoglu et al. ............ 370/238 |
| 7,286,467 | B1 | * | 10/2007 | Sylvain ......................... 370/216 |
| 7,921,686 | B2 | * | 4/2011  | Bagepalli et al. ............... 70/223 |
| 2004/0136324 | A1 | * | 7/2004 | Steinberg et al. ............. 370/238 |

FOREIGN PATENT DOCUMENTS

| WO | 2008/005274 |   | 1/2008 |
| WO | WO 2008005274 A2 | * | 1/2008 |

OTHER PUBLICATIONS

International Search Report issued in PCT/US2007/015000 on Dec. 7, 2007.
Written Opinion issued in PCT/US2007/015000 on Dec. 7, 2007.
ITEF RFC 5626, by Jennings, et al., Oct. 2009, describing Session Initiation Protocol (SIP).

* cited by examiner

*Primary Examiner* — Afsar M. Qureshi
(74) *Attorney, Agent, or Firm* — Nixon & Vanderhye P.C.; Joseph Pagnotta

(57) ABSTRACT

Systems and methods performed by a telephony device allow the telephony device to test the quality of multiple potential paths which can be used to conduct a telephony communication. By testing the conditions that presently exist, the telephony device can choose the path that is presently offering the best quality. A telephony communication may be setup over an initial path, and then subsequent testing may determine that it is best to switch to an alternate path offering better call quality. The initial path used for the telephony communication may be the one that offers the fastest initial connection. When multiple potential paths exist, the telephony communication may be conducted over a first path while keep alive messages are communicated over a second path so that the telephony communication can be quickly switched to the second path.

29 Claims, 16 Drawing Sheets

SYSTEMS AND METHODS OF ROUTING IP TELEPHONY DATA PACKET COMMUNICATIONS

BACKGROUND OF THE INVENTION

The invention is related to Internet Protocol (IP) telephony systems. More specifically, the invention is related to systems and methods for routing the data packets that carry communications enabled by an IP telephony system, such as telephone calls and text or video messages.

Existing IP telephony systems allow users to place and receive telephone calls or to send and/or receive other types of communications, such as text messages, SMS messages, MMS messages and the like. The communications are transmitted, at least in part, by data packets that traverse a private and/or public data network.

For example, a calling party can place a telephone call to a called party using an IP telephony device that is coupled to a private or public data network. When the user requests that the call be placed, an IP telephony system receives the request and sets up the call between the calling party's telephony device and the called party's telephony device. The called party's telephony device can also be an IP telephony device that is coupled to a private or public data network. Alternatively, the called party's telephony device could be an analog telephone that is coupled to a publically switched telephony network (PSTN). In still other instances, the called party's telephony device could be a cellular telephone or a mobile computing device with cellular telephone capabilities that is coupled to a cellular telephony network.

Typically, an IP telephony system receives a call setup request from the calling party's telephony device at an inbound proxy server (or a session border controller, or an originating gateway). The inbound proxy server consults a routing engine to determine the identity of an outbound proxy server (or session border controller or destination gateway) that is capable of communicating with the called telephony device. The inbound proxy server passes along the call setup request to the outbound proxy server. The outbound proxy server then contacts the called telephony device to attempt to setup the call.

During the call setup, the calling telephony device and the called telephony device are instructed where to send data packets bearing the media of the telephony communication so that those data packets can be delivered to the other telephony device. Often, a media relay is selected, and both the calling and called telephony devices are instructed to send data packets to the media relay, and to receive data packets from that media relay. In some instances, two or more media relays may be used in a chain fashion to create a path for the data packets to travel between the calling and called telephony devices.

Once the call has been setup, the called and calling telephony devices send data packets back and forth to each other using the path established during call setup. And this path typically no longer includes the inbound and outbound proxy servers. Instead, the path typically includes only one or more media relays that are used to help transmit the data packets between the calling and called telephony device.

The complete path that the data packets traverse across the data network usually includes other devices in addition to the media relays that are identified during call setup. For example, when both the calling telephony device and the called telephony device are IP telephony devices, the calling and called telephony devices will likely use an interface device of some type to gain access to the data network. The interface device could be a wired or wireless router, or some other type of data network interface device. Regardless, the interface devices are also a part of the overall path that data packets traverse as they travel between the calling and called telephony device.

If one of the calling and called telephony devices is an analog telephony device that reachable through a PSTN, or a cellular telephony device that is reachable via a cellular telephony service provider, the path will likely include a gateway that act as an interface between the data network and the PSTN or cellular telephony service provider.

If both the calling and called telephony device are IP telephony devices, in some instances, the called and calling telephony device may be instructed to send data packets directly back and forth between each other. In this instance, the path would not include a media relay. However, the path would still likely include the data network interface devices which the calling and called telephony devices use to access the data network.

In addition, when data packets are sent across a data network such as the Internet, the data packets typically make multiple separate hops between various nodes of the public Internet. As a result, two consecutive data packets generated by the calling telephony device could traverse vastly different paths as they make their way between the calling telephony device and the called telephony device.

The quality of a telephone call, or any other type of communication carried in this fashion, is highly dependent on how well the data packets carrying the media of the telephony communication are being transmitted over the relevant private and/or public data networks. If data packets are being lost, call quality will deteriorate. If transmitted data packets are being significantly delayed, call quality will deteriorate. Another problem is jitter, where the latency or delay is variable in nature. If jitter becomes a problem, call quality also will deteriorate.

Presently, IP telephony systems have only limited control over the path that data packets bearing the media of a telephony communication traverse as the data packets travel between a calling and called telephony device. Typically, the IP telephony can only determine the identity of the media relays that are used in the path.

When the IP telephony system had a choice about which media relay or relays to select for a particular telephony communication, the media relay or relays were often selected based on their physical proximity to the calling or called telephony devices, or based on their proximity to the proxy servers that were responsible for setting up the call. The assumption was that if the media relay(s) are physically close to the calling and/or called telephony devices, they will provide higher call quality than media relays that are located further away from the calling and/or called telephony devices. Unfortunately, this is not always a good assumption.

In some instances, the IP telephony systems would track the quality provided by individual media relays over an extended period of time. This historical data could also be used to select particular media relays for an individual telephony communication. However, databases indicating the call quality provided by various media relays are necessarily based on past performance. As a result, historical databases can only provide a prediction of the likely call quality that a media relay will provide based on how well the media relays performed in the past. Unfortunately, there is no guarantee that a media relay that performed well in the past will perform well for a new call that is just being setup.

Moreover, even if the initial path that is established for a telephony communication provides good quality, there is always the possibility that network conditions may change while the telephony communication is ongoing, and that those changes may result in a deterioration of the quality provided by the initial path. In known methods, once the path is established during call setup, the path cannot be changed.

What is needed is a method of selecting media relay(s) for a communications path for a telephony communication that takes into account the actual network conditions that exist at the time the telephony communication is being setup. What is also needed is a way to determine when the quality provided by a path is deteriorating, and a way to switch to a different path offering better quality while the telephony communication is ongoing.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications.

Figure 1:
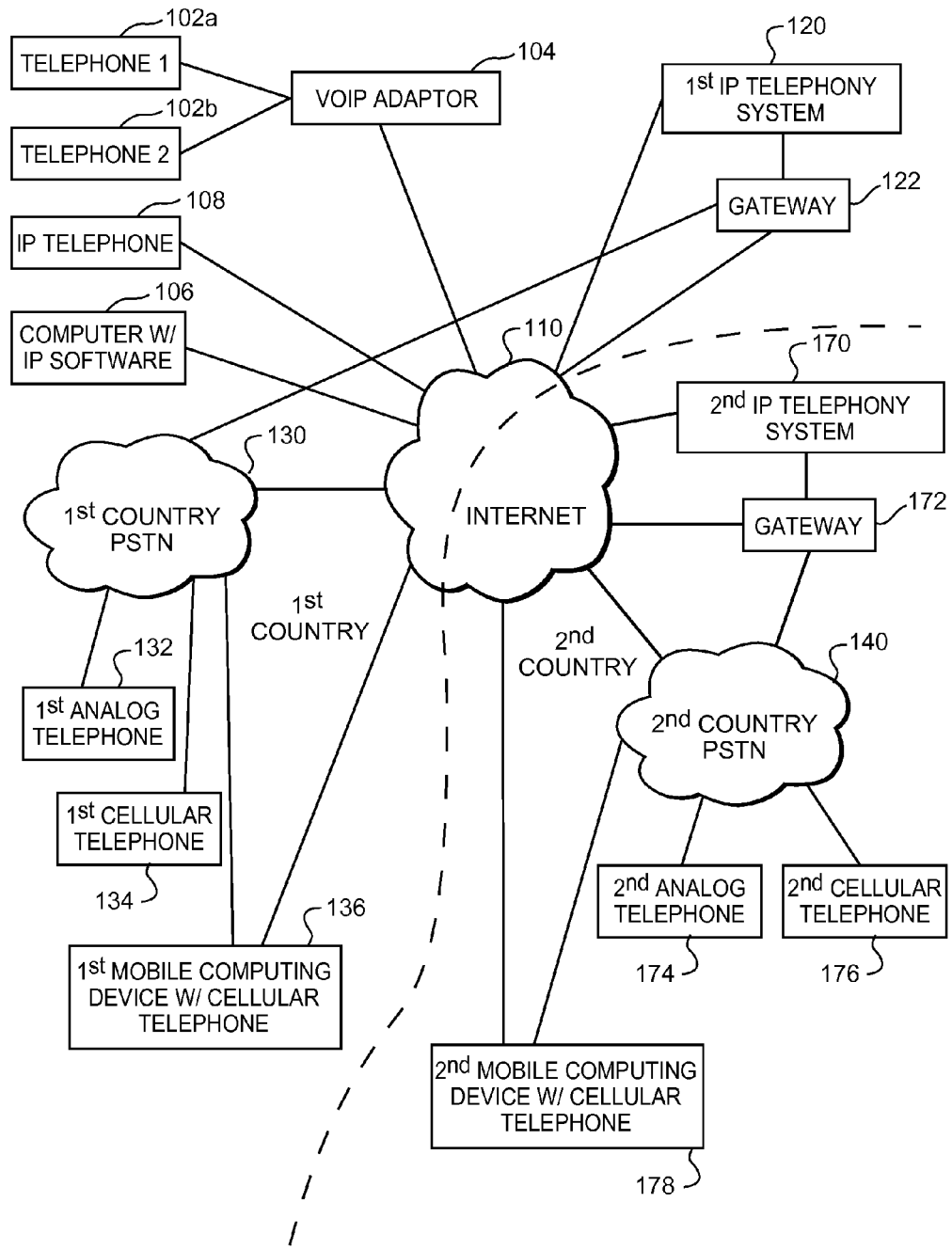
FIG. 1 is a diagram of a communications environment including various elements which are associated with an Internet protocol (IP) telephony system operating in accordance with the invention.

As illustrated in FIG. 1, a communications environment is provided to facilitate IP based communications. A first IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to both a first publicly switched telephone network (PSTN) 130 and a second PSTN 140 via one or more gateways 122.

The gateway 122 allows users and devices that are connected to the first and second PSTNs 130, 140 to connect with users and devices that are reachable through the first IP telephony system 120, and vice versa. In some instances, the gateway 122 would be a part of the first IP telephony system 120. In other instances, the gateway 122 could be maintained by a third party.

Customers of the first IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a cellular telephone system to access the Internet 110.

Alternatively, a customer could utilize a normal analog telephone 102a which is connected to the Internet 110 via a telephone adapter 104. The telephone adapter 104 converts analog signals from the telephone 102a into data signals that pass over the Internet 110, and vice versa. Also, as illustrated in FIG. 1, multiple analog telephone devices 102a and 102b could all be coupled to the same telephone adaptor 104. Analog telephone devices include, but are not limited to, standard telephones and document imaging devices such as facsimile machines. A configuration using a telephone adapter 104 is common where all of the analog telephone devices 102a, 102b are located in a residence or business, and all of the telephone devices are connected to the same telephone adapter. With this configuration, all of the analog telephone devices 102a, 102b share the same telephone number assigned to the telephone adaptor 104. Other configurations are also possible where multiple communication lines (e.g., a second telephone number) are provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected to one or more analog telephones 102.

A third party using the first analog telephone 132 which is connected to the first PSTN 130 may call a customer of the IP telephony system 120. In this instance, the call is initially connected from the first analog telephone 132 to the first PSTN 130, and then from the first PSTN 130, through the gateway 122 to the first IP telephony system 120. The first IP telephony system 120 then routes the call to the customer's IP telephony device. A third party using the first cellular telephone 134 could also place a call to an IP telephony system customer, and the connection would be established in a similar manner, although the first link would involve communications between the first cellular telephone 134 and a cellular telephone network. For purposes of this explanation, the cellular telephone network is considered part of the first PSTN 130.

In addition, mobile computing devices which include cellular telephone capabilities could also be used to place telephone calls to customers of the IP telephony system. The first mobile computing device 136, as illustrated in FIG. 1, might connect to the first PSTN 130 using its cellular telephone capabilities. However, such devices might also have the ability to connect wirelessly via some other means. For example, the mobile computing device 136 might communicate with a wireless data router to connect the first mobile computing device 136 directly to a data network, such as the Internet 110. In this instance, communications between the first mobile computing device 136 and other parties could be entirely carried by data communications which pass from the first mobile computing device 136 directly to a data network 110. Of course, alternate embodiments could utilize any other form of wired or wireless communications path to enable communications.

Users of the first IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the first IP telephony system 120. Further, in some instances a user could place a telephone call with the first analog telephone 132 or first cellular telephone 134 that is routed through the first PSTN 130 to the first IP telephony system 120 via the gateway 122. This would typically be accomplished by the user calling a local telephone number that is routed to the first IP telephony system 120 via the gateway 122. Once connected to the first IP telephony system 120, the user may then place an outgoing long distance call to anywhere in the world using the first IP telephony system's network. Thus, the user is able place a long distance call using lower cost IP telephony service provided by the first IP telephony system 120, rather than a higher cost service provided by the first PSTN 130.

FIG. 1 also illustrates that a second IP telephony system 170 may interact with the first IP telephony system 120 via the Internet 110. For example, customers of the second IP telephony system 170 may place calls to customers of the first IP telephony system 120. In that instance, assets of the second IP telephony system 170 interact with assets of the first IP telephony system 120 to setup and carry the telephone call. Conversely, customers of the first IP telephony system 120 can place calls to customers of the second IP telephony system 170.

The second IP telephony system could also interact with customers of a second PSTN 140 via a gateway 172. The second PSTN 140 may be connected to a second analog telephone 174, a second cellular telephone 176 and a second mobile computing device 178.

In the following description, we will assume that the first IP telephony system 120, the first PSTN 130, the IP telephone 108, the VOIP adaptor 104, the first analog telephone 132, the first cellular telephone 134 and the first mobile computing device 136 are all located in a first country. Also, the second IP telephony system 170, the second PSTN 140, the second analog telephone 174, the second cellular telephone 176 and the second mobile computing device 178 are all located in a second country.

Figure 2:
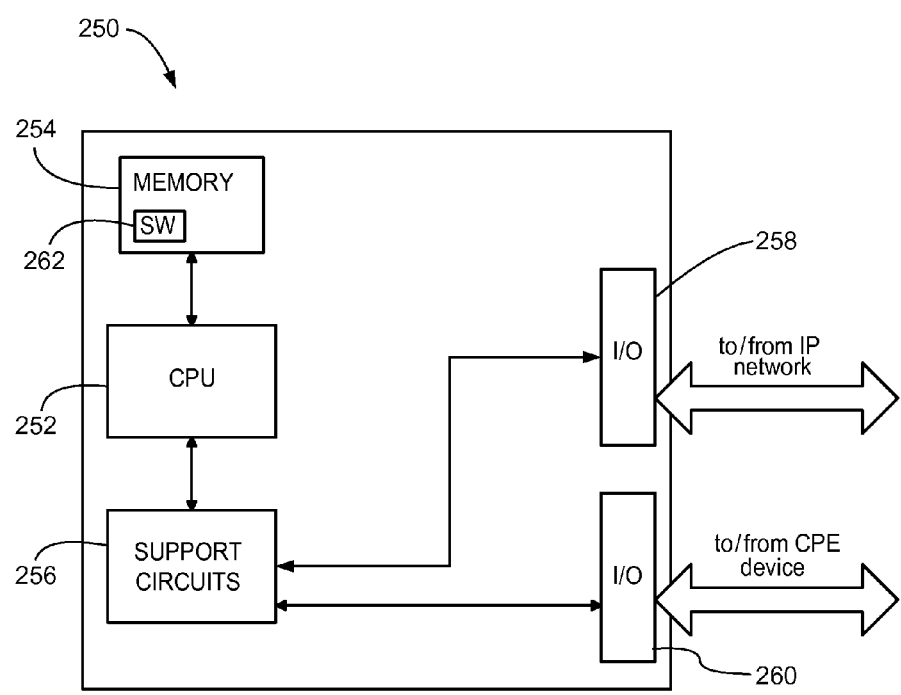
FIG. 2 is a diagram of various elements of a processor that forms part of an IP telephony system.

FIG. 2 illustrates elements of a computer processor 250 that can be used as part of the first or second IP telephony systems 120, 170 to accomplish various functions. Each of the IP telephony systems 120, 170 could include multiple processors 250 located at various locations in the system, along with their operating components and programming, each carrying out a specific or dedicated portion of the functions performed by the IP telephony systems 120, 170.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

In the following description, references will be made to an "IP telephony device." This term is used to refer to any type of device which is capable of interacting with an IP telephony system to complete a telephone call. An IP telephony device could be an IP telephone, a computer running IP telephony software, a telephone adapter which is connected to an analog telephone, or some other type of device capable of communicating via data packets. An IP telephony device could also be a cellular telephone or a portable or tablet computing device that runs a software client that enables the device to act as an IP telephone. Thus, a single device might be capable of operating as both a cellular telephone and an IP telephony device.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod touch can interact with an IP telephony system to conduct a telephone call.

The following description will also refer to telephony communications and telephony activity. These terms are intended to encompass all types of telephone communications, regardless of whether all or a portion of the calls are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

Figure 3:
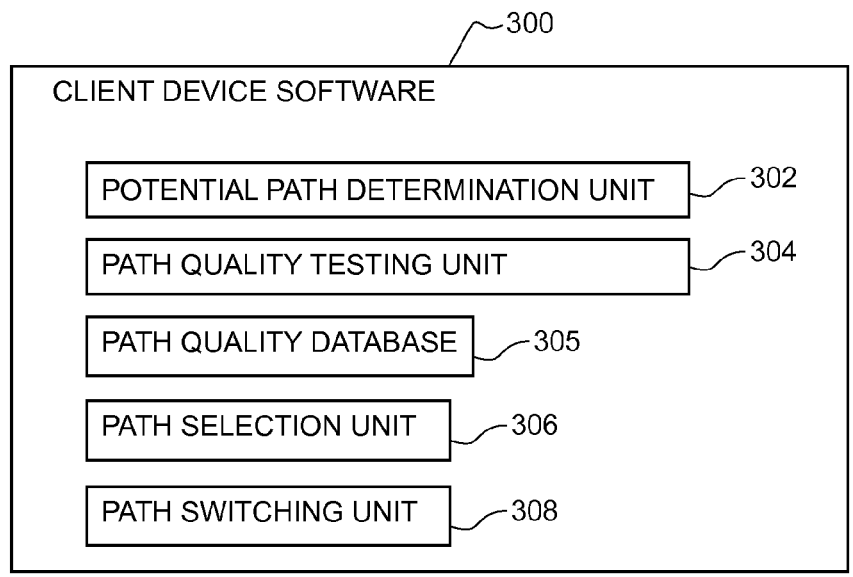
FIG. 3 is a block diagram illustrating elements of software which can be run on an IP telephony device to help test potential communication paths, and to control the routing of data packet communications.

FIG. 3 illustrates elements of a software application that may be run on a telephony device to accomplish various functions, as described in detail below. The software application 300 includes a potential path determination unit 302, a path quality testing unit 304, a path quality database 305, a path selection unit 306 and a path switching unit 308.

Figure 4:
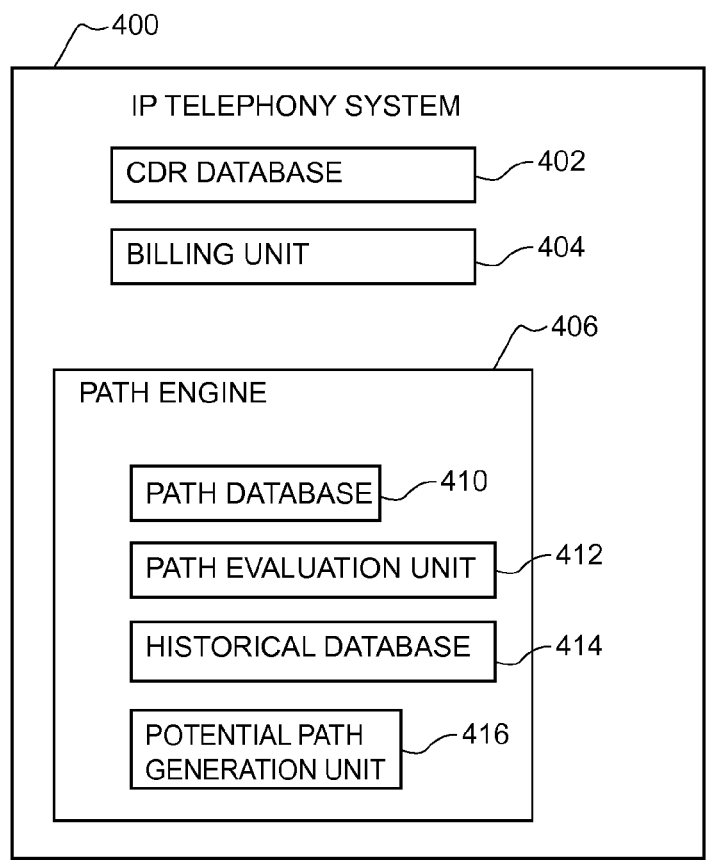
FIG. 4 is a diagram illustrating selected elements of an IP telephony system which includes a path engine that supplies recommended data transmission paths to IP telephony devices.

FIG. 4 illustrates selected elements of an IP telephony system 400 which performs various functions in accordance with the invention. The IP telephony system 400 includes a CDR database 402, and a billing unit 404. The IP telephony system 400 also includes a path engine 406, which includes a path database 410, a path evaluation unit 412, a historical database 414, and a potential path generation unit 416. A detailed description of how these elements of the IP telephony system 400 interact with telephony devices and elements of a data network to set up and route telephony communications is provided below.

As explained in the background section above, during call setup procedures, the calling telephony device and the called telephony device are informed of a communication path which can be used to transmit and receive data packets containing the media of the telephony communication. The called telephony device and the calling telephony device then route data packets bearing the media of the telephony communication through the identified communication path.

Each communication path can include one or more media relays. The IP telephony system may select a particular media relay to be used as part of a communications path based on the proximity of the media relay to the called and calling telephony devices, based on historical data about the quality that the media relay typically offers, based on the cost of using the media relay, and based on a variety of other considerations. Unfortunately, when the media relays are selected in this fashion, the actual current conditions which exist within the data network are not always taken into account.

Periodic Testing of Communication Paths

In a first set of methods described below, a telephony device conducts real world testing of one or more potential communication paths which could be used to transmit and receive data packets bearing the media of a telephony communication. These tests can be performed periodically by the telephony device. Alternatively, the testing could occur after a triggering event has occurred, as will be explained in more detail below. The results of the testing are then used to select a path for data packets bearing the media of a telephony communication. As a result, the path which is selected is based on the actual conditions which presently exist, and not just historical data about past performance.

Figure 5:
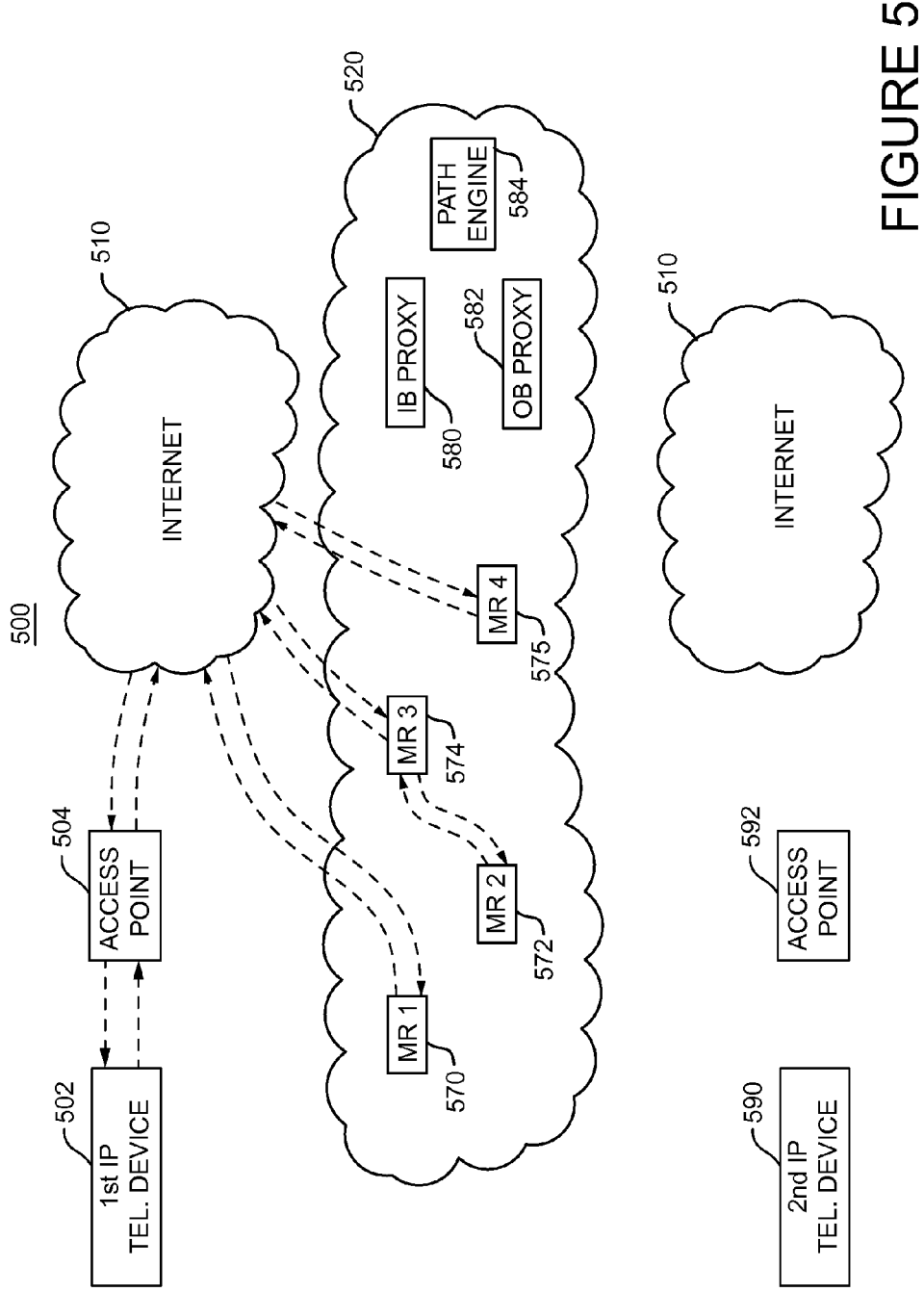
FIG. 5 is a diagram illustrating how a telephony device can test the quality of one or more potential paths that could be used to transmit data packets bearing the media of a telephony communication.

FIG. 5 illustrates a communications environment 500 in which a method of testing multiple potential paths is conducted. As shown in FIG. 5, a first IP telephony device 502 communicates with the Internet 510 over an access point 504. The access point 504 could be a wired or wireless access point which provides the first IP telephony device 502 with access to the Internet 510.

FIG. 5 also illustrates that an IP telephony system 520 includes an inbound proxy server 580, an outbound proxy server 582, and a path engine 584. The IP telephony system 520 also includes multiple media relays. In the embodiment illustrated in FIG. 5, the IP telephony system 520 includes a first media relay 570, a second media relay 572, a third media relay 574 and fourth media relay 575.

In the following embodiments, one or more media relays which form part of a communication path between two telephony devices are illustrated as being a part of an IP telephony system. However, in alternate embodiments, the media relays which form all or part of a communication path can be owned and controlled by third parties. Also, some communication paths could include one or more media relays which are part of an IP telephony system, as well as one or more media relays which are owned and/or controlled by a third party. Thus, the illustration of the media relays as being part of the IP telephony system should in no way be considered limiting.

When the first IP telephony device 502 utilizes the IP telephony system 520 to set up and conduct a telephony communication, the first IP telephony device 502 could use any of the first, second, third and fourth media relays as part of a communication path that extends between the first IP telephony device 502 and another telephony device. As a result, it is desirable to test a quality of communication paths that exist between the first IP telephony device 502 and each of the potential media relays. Once those tests have been conducted, the first IP telephony device 502 will have information about the quality that can be offered by paths extending through each of the media relays.

The quality of a path refers generally to the ability of the path to transmit data packets quickly, in sequential order, and without losses. Traditional measures of quality include the rate at which data packets can be communicated along a path, the average time delay in getting data packets between two points, the number of packets that are lost, and jitter, which is a measure of the variability of the transmission delays which may be experienced by individual data packets. These measures and others may be combined in some fashion to provide an overall quality measure of a communications path.

The quality of a particular path may also be determined based, at least in part, on a calculated mean opinion score (MOS). Although a MOS can be calculated subjectively by human test personnel, software has also been developed to automatically calculate a MOS for telephony communications that pass over a path. The calculated MOS may be taken into account, along with other factors, to determine the overall quality offered by a path.

Also, a perceptual evaluation of speech quality (PESQ) score may be calculated for a path. Various standards and software exists to compute a PESQ score for a telephony communication passing along a path. The PESQ score for a path may be used along with the other measures described above to determine the overall quality of a particular path.

FIG. 5 also illustrates that a second IP telephony device 590 can utilize an access point 592 to obtain access to the Internet 510. This would allow the first IP telephony device 502 to communicate with the second IP telephony device 590 via data packet communications which pass through one or more media relays of the IP telephony system 520. However, before a telephony communication is established, the first IP telephony device 502 conducts testing of multiple potential paths which could be used to conduct a telephony communication with the second IP telephony device 590.

Figure 6:
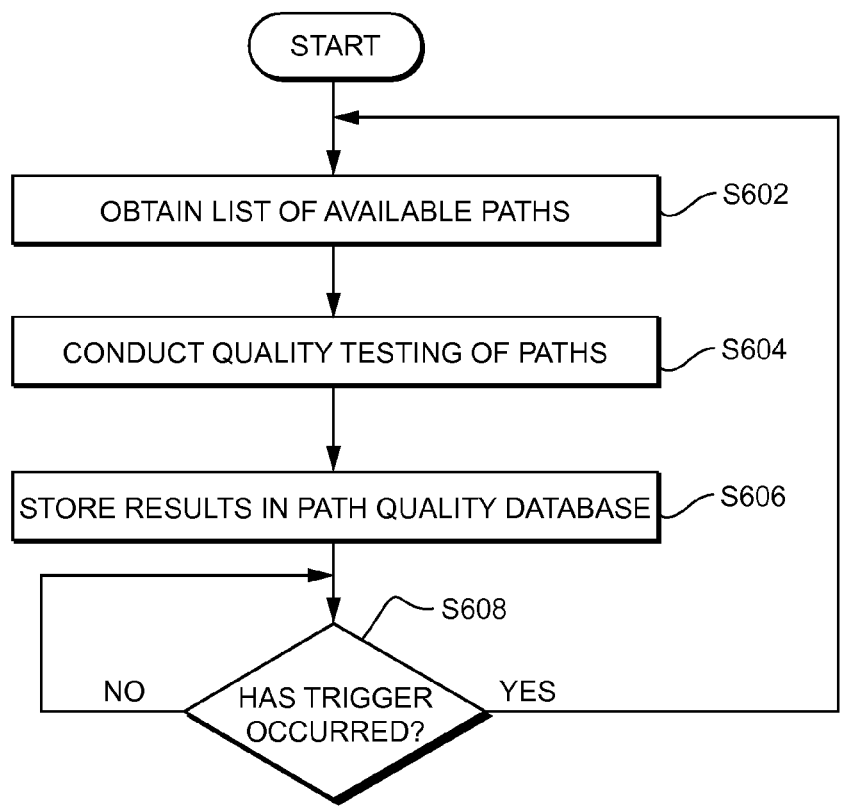
FIG. 6 is a diagram illustrating steps of a method of testing the quality of one or more potential paths that could be used to transmit data packets bearing the media of a telephony communication.

FIG. 6 illustrates steps of a method which could be performed by the first IP telephony device 502 to test the quality of multiple potential paths. A software application on the first IP telephony device 502, including the elements illustrated in FIG. 3, could be used to perform the method illustrated in FIG. 6.

The method would begin and proceed to step S602 where the software application 300 on the first IP telephony device 502 obtains a list of available communication paths. Specifically, as illustrated in FIG. 3, the potential path determination unit 302 obtains a list of available paths. This list of available paths could be provided to the software application 300 by elements of an IP telephony system 400 upon request, or on a periodic basis. Alternatively, the potential path determination unit 302 of the telephony device software 300 could periodically query the IP telephony system 400 to obtain a list of potential paths, or such a query could be issued upon the occurrence of a triggering event.

As illustrated in FIG. 4, an IP telephony system can include a path engine 406 which includes a path database 410 and a potential path generation unit 416. The path database 410 could include a list of all potential paths which are available to the IP telephony system 400. The path database 410 could include information about individual media relays, such as the location of the media relays, and the functional capabilities of the media relays. The path database 410 could also include information about the cost of using the media relays. Further, the path database 410 could include information about the historical quality offered by individual media relays, or predetermined combinations of media relays.

The potential path generation unit 416 utilizes information in the path database 410, to determine which communication paths are available to an IP telephony device for conducting a telephony communication. The potential path generation unit 416 may also take into account information about the IP telephony devices themselves. For example, an IP telephony device 108 located in a first country may have access to only a selected number of media relays. In addition, a particular IP telephony device may require that certain functions be performed by a media relay. As a result, only those media relays capable of providing the required functions could be part of a potential path used by that IP telephony device.

When an IP telephony device requests a list of potential paths for a telephony communication, the potential path generation unit 416 utilizes information in the path database 410, as well as possibly information about the IP telephony device making the request and/or information about the telephony device to which the communication will be sent, to determine which potential paths are available. The potential path generation unit 416 then sends a listing of those paths to the requesting IP telephony device.

As noted above, the process of determining which paths are available to an IP telephony device could be repeated on a periodic basis, and the results could be sent to the IP telephony device each time that the process is performed. In some instances, the process is only performed upon the occurrence of a triggering event, such as the IP telephony device registering with the IP telephony system via an access point. If an IP telephony device moves from a first location to a second location, when the IP telephony device registers with the IP telephony system from the second location, the location information could be taken into account by the path engine 406 in determining which potential communication paths exist.

In still other embodiments, the IP telephony device itself may be capable of determining which paths are available for establishing a telephony communication. Specifically, the potential path determination unit 302 of the telephony device software 300 on the IP telephony device may have the ability to determine whether communications can be established with individual media relays which are capable of sending and receiving data packets bearing the media of a telephony communication. The potential path determination unit 302 may obtain a list of all available media relays from an IP telephony system, and then use the list to attempt to contact each of the media relays.

Returning to the method illustrated in FIG. 6, once the first IP telephony device 502 has obtained or generated a list of available paths in step S602, the method proceeds to step S604 where the first IP telephony device 502 conducts testing of all the available paths. This testing would be conducted by the path quality testing unit 304 of the telephony device software 300 on the IP telephony device 502.

Individual path testing could be conducted by sending test data packets from the IP telephony device 502 through the access point 504 and the Internet 510 to each of the individual media relays, as illustrated by the dashed lines in FIG. 5. The dashed lines in FIG. 5 illustrate data packets being sent to media relays, and responses being sent from the media relays back to the IP telephony device 502.

For example, as illustrated in FIG. 5, the first IP telephony device 502 could send a stream of test data packets which mimic a typical telephony communication through the access point 504 and the Internet 510 to the first media relay 570. Upon receiving the test data packets, the first media relay 570 sends back either a copy of the data packets originally transmitted, or a response message containing new or different information. The response message would be sent from the first media relay 570 back through the Internet 510 and the access point 504 to the first IP telephony device 502. The path quality testing unit 304 of the telephony device software 300 on the first IP telephony device 502 then evaluates the reply message from the first media relay 570 to the determine a quality of the communication path that exists between the first IP telephony device 502 and the first media relay 570.

In a similar fashion, the first IP telephony device 502 could send a stream of test data packets through the access point 504 and the Internet 510 to the fourth media relay 575. The fourth media relay 575 sends a response message back through the Internet 510 and the access point 504 to the first IP telephony device 502. The path quality testing unit 304 of the telephony device software 300 then analyzes the reply message from the fourth media relay 575 to determine a quality of the communication path that exists between the first IP telephony device 502 and the fourth media relay 575.

FIG. 5 also illustrates that a communication path may include two or more media relays which are arranged in a chain fashion. In the embodiment illustrated in FIG. 5, the first IP telephony device 502 sends a plurality of test data packets through the access point 504 and the Internet 510 to the third media relay 574. However, those data packets are addressed to the second media relay 572. As a result, the third media relay 574 passes the test data packets on to the second media relay 572. The second media relay 572 then sends a reply message back through the third media relay 574, the Internet 510 and the access point 504 to the first IP telephony device 502. The path quality testing unit 304 analyzes the reply message sent from the second media relay 572 to determine a quality of the communication path that exists between the first IP telephony device 502 and the second media relay 572.

Once the path quality testing unit 304 has sent test data packets through each of the available paths, and has analyzed the quality of each of those paths, in step S606, the path quality information is stored in a path quality database 305.

As illustrated in FIG. 6, the method proceeds to step S608, where a determination is made as to whether a triggering event has occurred. When a triggering event occurs, the method loops back to step S602, and the steps of obtaining a list of available paths, conducting quality testing, and storing the test results in the path quality database are repeated. On the other hand, if no triggering event has yet occurred, the methods simply loops back and repeats step S608 until a triggering event occurs.

A triggering event which causes the available communication paths to be re-determined and re-tested could simply be the expiration of a pre-determined period of time after the last quality tests were conducted, or since the last time that the available paths were determined. The triggering event could also be the IP telephony device switching from a first data connection to a second data connection. For example, if the IP telephony device reestablishes a connection to the IP telephony system via a new and different data access point, the conditions which existed during the last testing steps would no longer exist. Some of the paths that were previously available may no longer be available, and some new paths may have become available. Also, even the same paths may not provide the same quality through the new data connection. For these reasons, it makes sense to repeat the steps of identifying the available paths and conducting quality testing on the new paths if the IP telephony device has established a new data connection.

Also, if the IP telephony device switches from a first physical location to a second physical location, which would also involve reestablishing a new data connection to the IP telephony system, the new location of the IP telephony device may also change which data paths are available to the IP telephony device. As a result, when the IP telephony device moves from a first location to a second location, the steps of identifying the available paths and testing the paths would be repeated.

Setting Up a Telephony Communication Using Test Data

Figure 7:
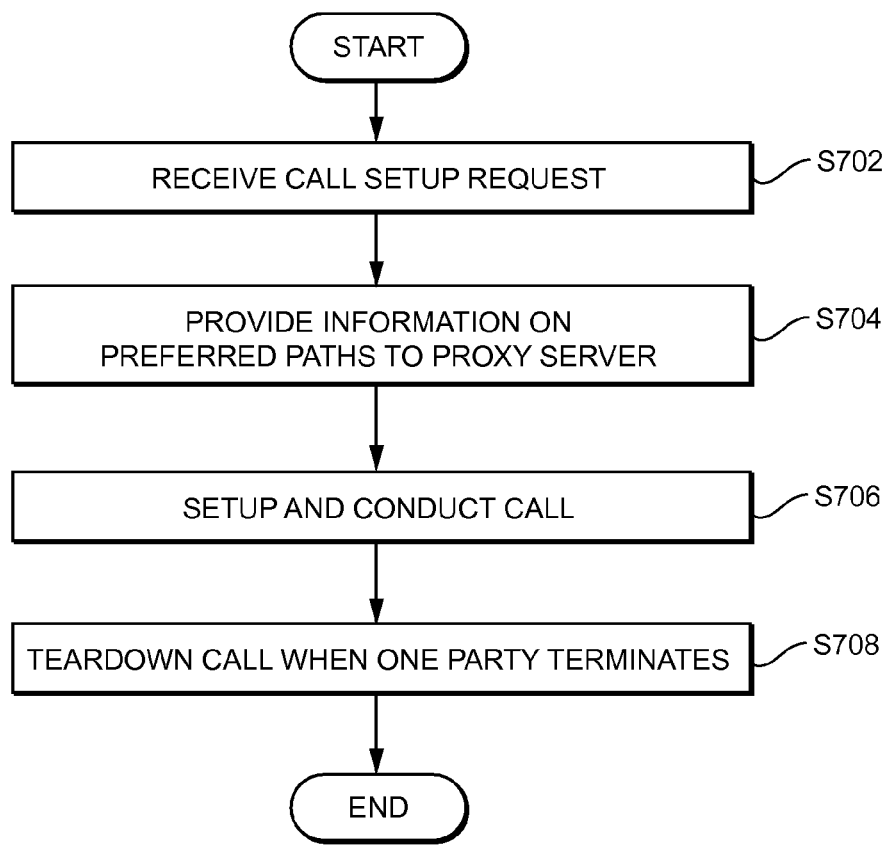
FIG. 7 is diagram illustrating steps of a method of setting up, conducting and terminating a telephony communication.

A method that would be performed when a first IP telephony device is attempting to set up a telephony communication with a second IP telephony device will now be explained with reference to FIGS. 7 and 8. The steps illustrated in FIG. 7 would be performed by the second IP telephony device, which is the called device.

Figure 8:
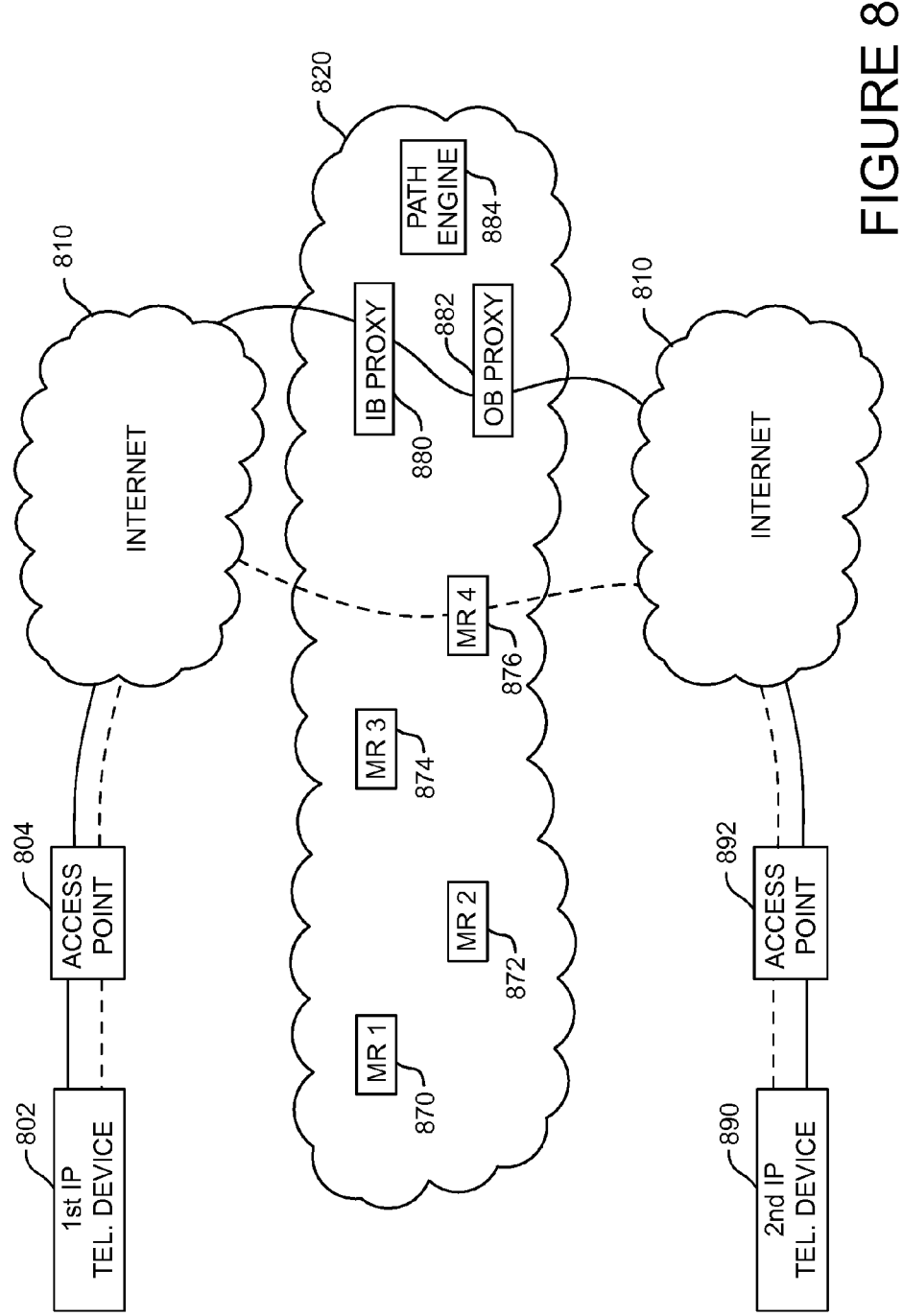
FIG. 8 is a diagram illustrating the paths that are traversed between first and second telephony devices by data packets bearing setup signaling and the media of a telephony communication.

In this method, the first IP telephony device 802 illustrated in FIG. 8 is attempting to set up and conduct a telephony communication with the second IP telephony device 890. The first IP telephony device 802 sends a telephony communication setup request to an inbound proxy server 880 of the IP telephony system 820. The solid lines in FIG. 8 illustrate the path traversed by data packets bearing the setup signaling when the telephony communication is originally setup, and possibly also when the telephony communication is being terminated. The dashed lines in FIG. 8 illustrate the paths which are traversed by data packets bearing the media of a telephony communication.

When the inbound proxy server 880 receives the setup request from the first IP telephony device 802, it locates an outbound proxy server 882 which is capable of communicating with the second IP telephony device 890. The inbound proxy server 880 then forwards the setup request to the outbound proxy server 882. The outbound proxy server 882 sends the setup request through the Internet 810 and the access point 892 to the second IP telephony device 890. At this point, the second IP telephony device 890 begins to perform the method illustrated in FIG. 7.

The method begins and proceeds to step S702, where the second IP telephony device 890 receives the telephony communication setup request. Telephony device software 300 on the second IP telephony device 890 then determines which of multiple potential paths are available to conduct the IP telephony communication with the first IP telephony device 802, and which of those paths are likely to provide the best quality. The telephony device software 300 on the second IP telephony device 890 would have been periodically performing testing steps, as illustrated in FIG. 6, to determine the quality of all potential paths available to it, and that quality information would be available in the path quality database 305 of the telephony device software 300.

More specifically, when the setup request is received, a path selection unit 306 of the telephony device software 300 on the second IP telephony device 890 consults the information in the path quality database 305 to determine which potential path is likely to provide the best call quality. This determination may be based, in part, on the identity and location of the first IP telephony device 802. The identity and location of the first IP telephony device 802 may be determined using caller ID information which is included in the setup request sent from the outbound proxy 882. Alternatively, the setup request could include information about the potential paths that are available to carry the telephony communication. And the path selection unit 306 of the telephony device software 300 on the second IP telephony device would then examine the relative quality of the paths identified in the setup request to determine which path is likely to offer the best quality.

In step S704, the path selection unit 306 of the telephony device software 300 informs the outbound proxy server 882 of the path which is likely to offer the best quality. In this instance, that path runs through the fourth media relay 876.

In step S706, the path information is communicated back to the first IP telephony device 802 via the inbound proxy server 880, the Internet 810, and the access point 804. As a result, both the first IP telephony device 802 and the second IP telephony device 890 know to communicate with each other via a path which passes through the fourth media relay 876. The telephony communication then begins. Specifically, the second IP telephony device 890 generates a stream of data packets bearing the media of the telephony communication, and sends that stream of data packets to the first IP telephony device 802 through the fourth media relay 876. Likewise, the first IP telephony device 802 generates a stream of data packets bearing the media of the telephony call and sends the stream to the second IP telephony device 890 via the fourth media relay 876. The telephony communication proceeds in this fashion until one or both parties choose to terminate the telephony communication. At that point, in step S708, the telephony communication is terminated.

In the embodiment described above, the called telephony device identifies the communication path which is to be used for the telephony communication. In alternate embodiments, the telephony device which is requesting that the telephony communication be established, in this instance, the first IP telephony device 802 may inform the inbound proxy server 880 of the communication path which it would like to use in order to conduct the telephony communication. In this instance, information about the path which is to be used would be relayed from the inbound proxy server 880 to the outbound proxy server 882, and then to the second IP telephony device 890 during the setup procedures. Thus, either the calling IP telephony device or the called IP telephony device may provide information about the path which is to be used for a telephony communication. In either case, the path selection would be based upon quality information which has been obtained by real world testing conducted by the IP telephony device identifying the preferred path.

In yet other embodiments of the invention, the first IP telephony device 802 requesting that the telephony communication be established may specify one or more preferred communication paths for the telephony communication, and the second IP telephony device 890, when it receives the setup request, may also provide information about one or more paths which it would prefer to use for the telephony communication. An element of the IP telephony system 820, such as the inbound proxy server 880 or the outbound proxy server 882, or possibly a path engine 884 would use this information to determine the communication path that is ultimately selected for the telephony communication. Thus, in some embodiments it may also be possible for information developed through testing at both of the IP telephony devices to be used to determine the communication path that is selected for the telephony communication.

Embodiments where Quality Testing is Conducted while a Telephony Communication is Ongoing Alternate embodiments in which quality testing is conducted while a telephony communication is in progress will now be described with reference to FIGS. 9-12. In these alternate embodiments, a telephony communication is first established between a first IP telephony device and a second IP telephony device over an initial communication path. While the telephony communication is in progress, one or both of the IP telephony devices identify alternate paths which could be used to carry the telephony communication. One or both of the IP telephony devices then conduct quality testing of the path which is in use, and the identified alternate paths. If one of the alternate paths offers better quality then the path which is use, the telephony communication is switched to the alternate path. This process is repeated throughout the duration of the telephony communication, and whenever an alternate path is identified as offering better quality than the path which is currently in use, the telephony communication is switched to the alternate path offering better quality.

As is also described below, when a telephony communication is switched from a first path to a second path, "keep-alive" messages may be transmitted between the first and second IP telephony devices over the first path after the switch has occurred to keep the first path available for immediate use. This makes it possible to quickly and easily switch the telephony communication from the second path back to the first path, should quality of the second path degrade.

Figure 9:
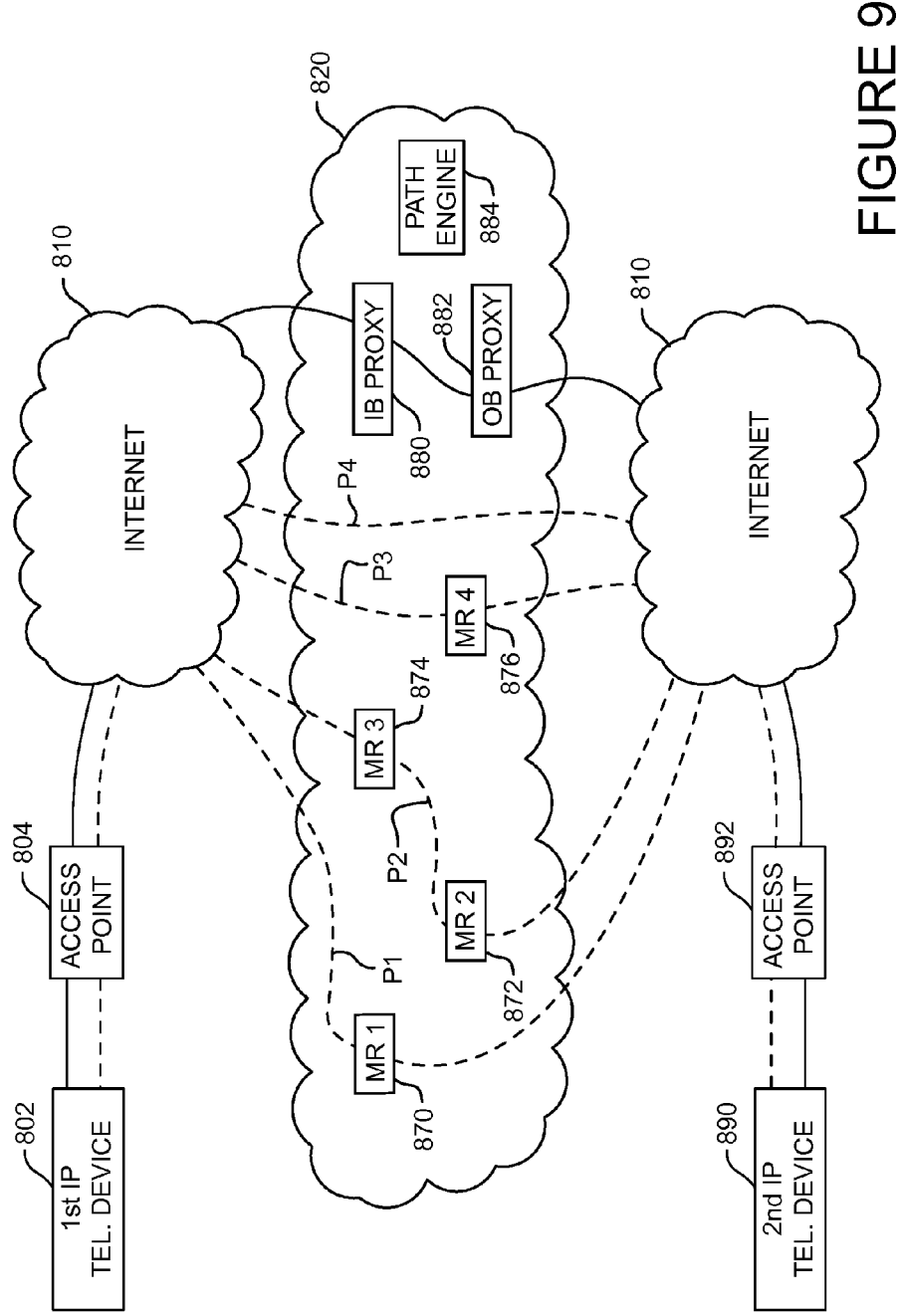
FIG. 9 is a diagram illustrating how the quality of a plurality of alternate paths may be tested while a telephony communication is ongoing over an initial path.

For purposes of this explanation, we will assume that the first IP telephony device 802 in FIG. 9 is attempting to setup a telephony communication with the second IP telephony device 890. Similar to the description provided above, the first IP telephony device 802 sends a setup request through the access point 804 and the Internet 810 to the inbound proxy server 880. The inbound proxy server 880 identifies an outbound proxy server 882 capable of communicating with the second IP telephony device 890. The setup signaling is then be forwarded through the outbound proxy server 882, the Internet 810 and the access point 892 to the second IP telephony device 890.

Figure 12:
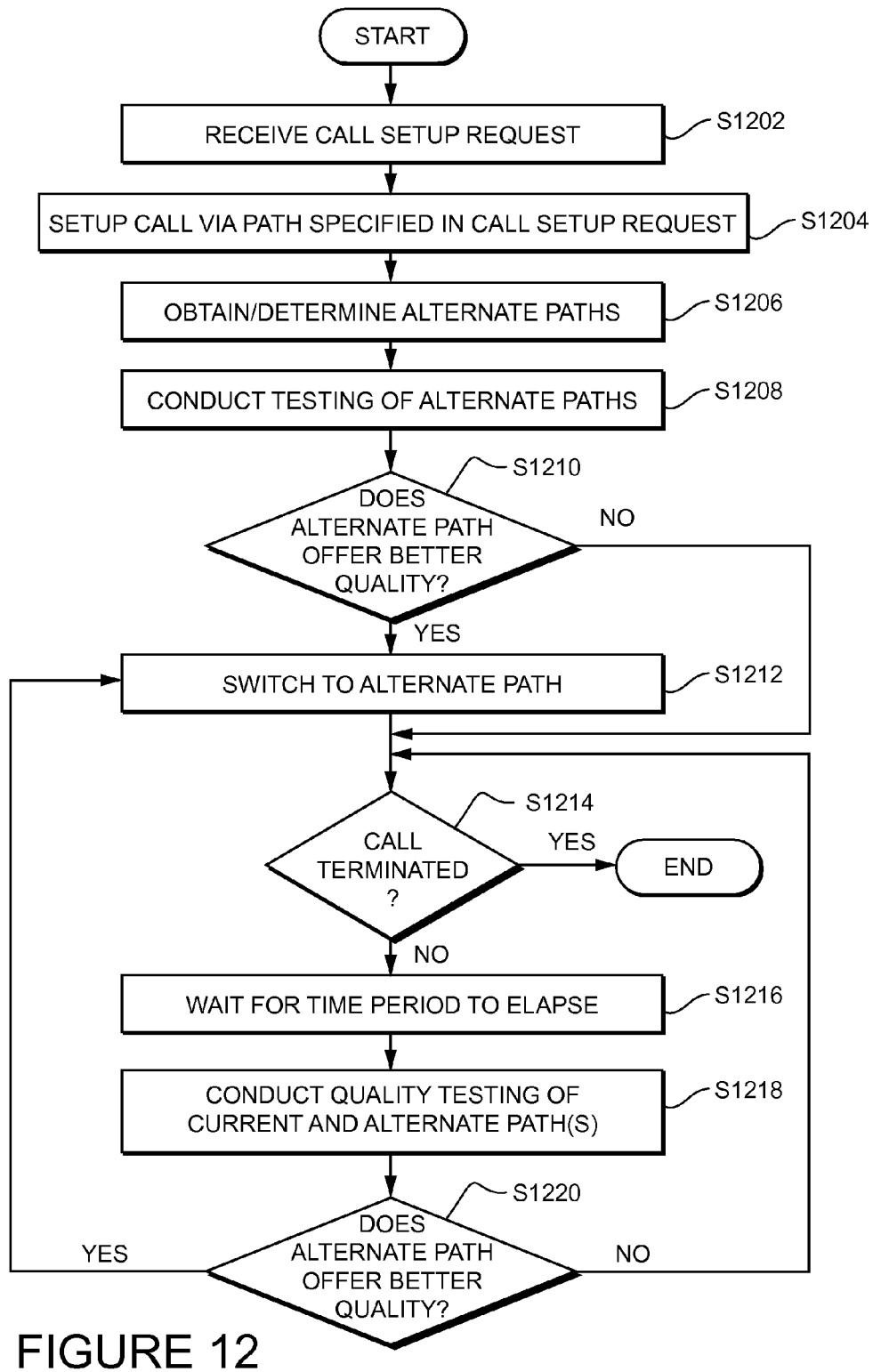
FIG. 12 illustrates steps of a method which may be performed by an IP telephony device to setup a telephony communication over a first path, conduct periodic testing of the first path and alternate paths, and switch the telephony communication to an alternate path if the alternate path offers better quality.

The method illustrated in FIG. 12 is performed by the second IP telephony device 890. The method would begin, in step S1202, when the second IP telephony device 890 receives the setup request. In the embodiments described above, the second IP telephony device 890 could identify the path it would like to use for the telephony communication. Also, the first IP telephony device 802 could have originally identified a communication path that it would like to use for the telephony communication. Further, as also explained above, information about preferred paths provided by both the first IP telephony device 802 and the second IP telephony device 890 could be used to determine the initial path for the telephony communication. In this embodiment, however, we will assume that a path engine 884 of the IP telephony system 820 identifies an initial path which is to be used for the telephony communication. Further, this initial path is path P2 (see FIG. 9) which passes through the third media relay 874 and the second media relay 872. This path would be identified in the setup request which is sent to the second IP telephony device 890. Setup signaling would also be sent to the first IP telephony device 802 to inform the first IP telephony device 802 that path P2 is to be the initial path used for the telephony communication.

The method proceeds to step S1204, where the telephony communication is commenced between first IP telephony device 802 and the second IP telephony device 890 through path P2, which passes through the second media relay 872 and the third media relay 874.

Once the telephony communication is begun, the method proceeds to step S1206, where the second IP telephony device 890 obtains or determines one or more alternate paths which could be used for the telephony communication. In some instances, the potential path determination unit 302 of the telephony device software 300 on the second IP telephony device 890 would determine the alternate paths which could be used for the telephony communication. In other embodiments, the potential path determination unit 302 could obtain information about alternate paths from the path engine 884 of the IP telephony system 820.

The method then proceeds to step S1208, where the path quality testing unit 304 of the telephony device software 300 on the second IP telephony device 890 conducts quality testing of the path P2 which is currently in use, as well as the alternate paths. FIG. 9 illustrates that the alternate paths could include a path P1 which runs through the first media relay 870, a path P3 which runs through the fourth media relay 876, and a path P4 which passes through no media relays, and instead runs directly from the first IP telephony device 802 to the second IP telephony device 890.

As discussed above, the quality of the paths could be determined by sending test data packets to each of the media relays on the paths, and then evaluating test data packets of response messages which are sent back from the media relays. In this instance, however, because a communication has been established with a different IP telephony device, the testing may involve sending test data packets from the second IP telephony device 890 to the first IP telephony device 802 via each of the paths. The first IP telephony device 802 would then send response messages back along each of the respective paths. The second IP telephony device 890 would then evaluate each of the response messages sent back via each respective path to determine he respective quality of each of the paths.

In step S1210, a determination is made as to whether one of the alternate paths offers better quality than the path which is currently in use, in this instance, path P2. This determination could be made by the path quality testing unit 304 or the path selection unit 306 of the telephony device software 300 on the second IP telephony device 890.

If the check performed in step S1210 indicates that none of the alternate paths provide better quality than the path P2 that is currently in use, the method proceeds to step S1214, where determination is made as to whether the call has been terminated. If the call has not yet been terminated, the method proceeds to step S1216, and a delay period is allowed to expire. The method then proceeds to step S1218, where the path quality testing unit 304 of the telephony device software 300 on the second IP telephony device 890 conducts another round of quality testing on both the current path and the alternate paths. The method then proceeds to step S1220, where another determination is made as to whether one of the alternate paths offers better quality than the path currently in use. If none of the alternate paths offer better quality, the method loops back to step S1214, and the steps discussed above are repeated.

If the determination made in step S1220 indicates that an alternate path offers better quality than the path currently in use, the method loops to step S1212. The method could also arrive at step S1212 if the determination made in step S1210 indicates that an alternate path provides better quality than the initial path which was selected for the telephony communication.

In step S1212, the telephony communication is switched from its present path to the alternate path offering better quality. The method of switching from one path to another will be illustrated with reference to FIGS. 10 and 11.

Figure 10:
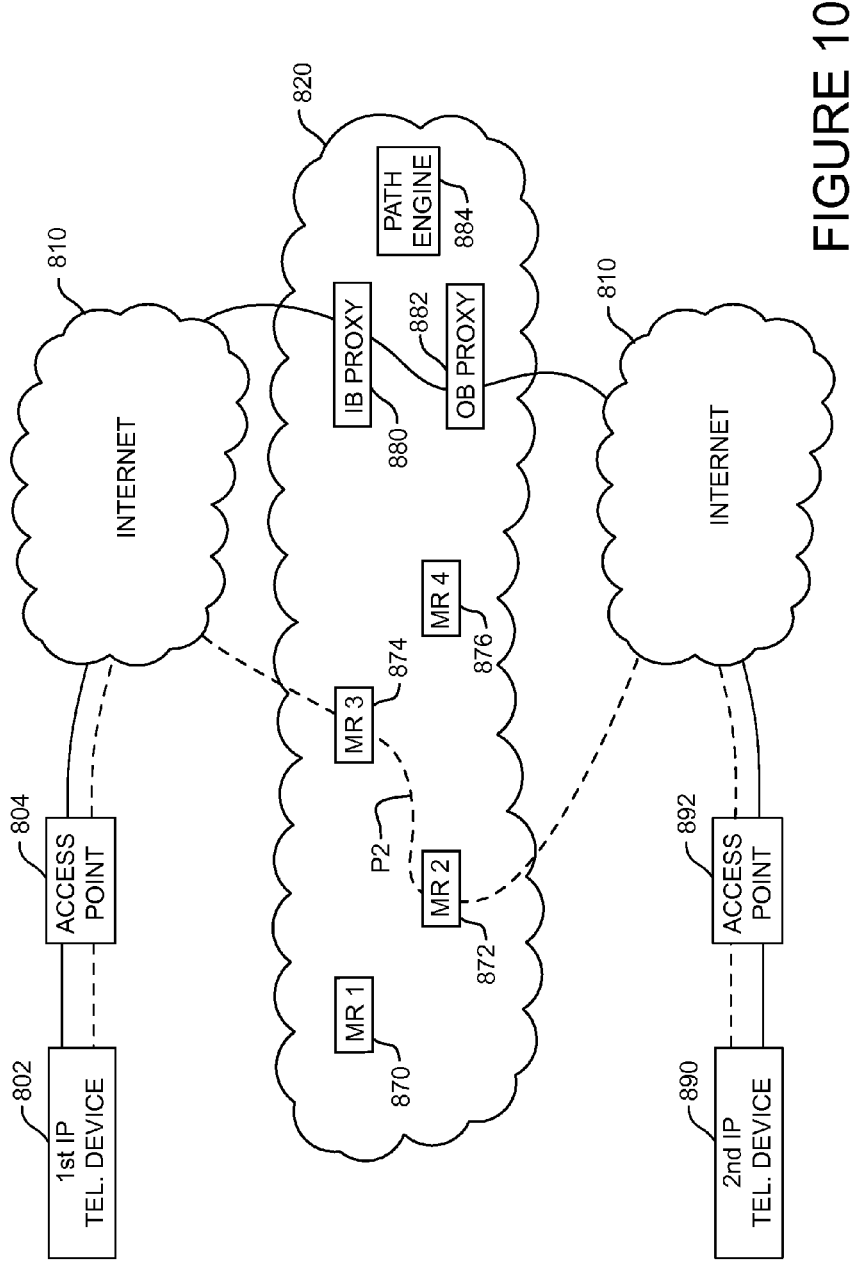
FIG. 10 is a diagram illustrating how the path traversed by data packets bearing the media of a telephony communication can change from the path illustrated in FIG. 8.

FIG. 10 illustrates the conditions which would exist after the telephony communication is first established over initial path P2, which passes through the second media relay 872 and the third media relay 874. During the switch, the telephony communication is to be changed to alternate path P3, which passes through the fourth media relay 876. In order to switch the telephony communication from the initial path P2 to the alternate path P3, both the first telephony device 802 and the second telephony device 890 must be informed that the switch is to occur. Information regarding the switch could be sent to the first IP telephony device 802 and the second IP telephony device 890 through call control signaling, which is represented by the solid lines in FIG. 10. FIG. 10 illustrates that the inbound proxy server 880 and the outbound proxy server 882 may be used to communicate this information to the first IP telephony device 802 and the second IP telephony device 890. However, in alternate embodiments, other elements of the IP telephony system 820 could send this information.

In preferred embodiments, the first IP telephony device 802 and the second IP telephony device 890 are instructed to build up buffers of the data packets being sent back and forth between the IP telephony devices before the switch occurs. Once the buffers are full, the first and second IP telephony devices are instructed to begin sending data packets bearing the media of the IP telephony communication in parallel through both the initial path P2 and the alternate path P3. The IP telephony devices will continue to use the data packets being sent via the initial path P2 until it is clear that the alternate path P3 is operational. Once it is clear that data packets are being successfully delivered via the alternate path P3, the first and second IP telephony devices are instructed to begin using the data packets being communicated over the alternate path P3. Any short term disruption which occurs as the switch is being made could be handled through use of data in the data buffers.

Figure 11:
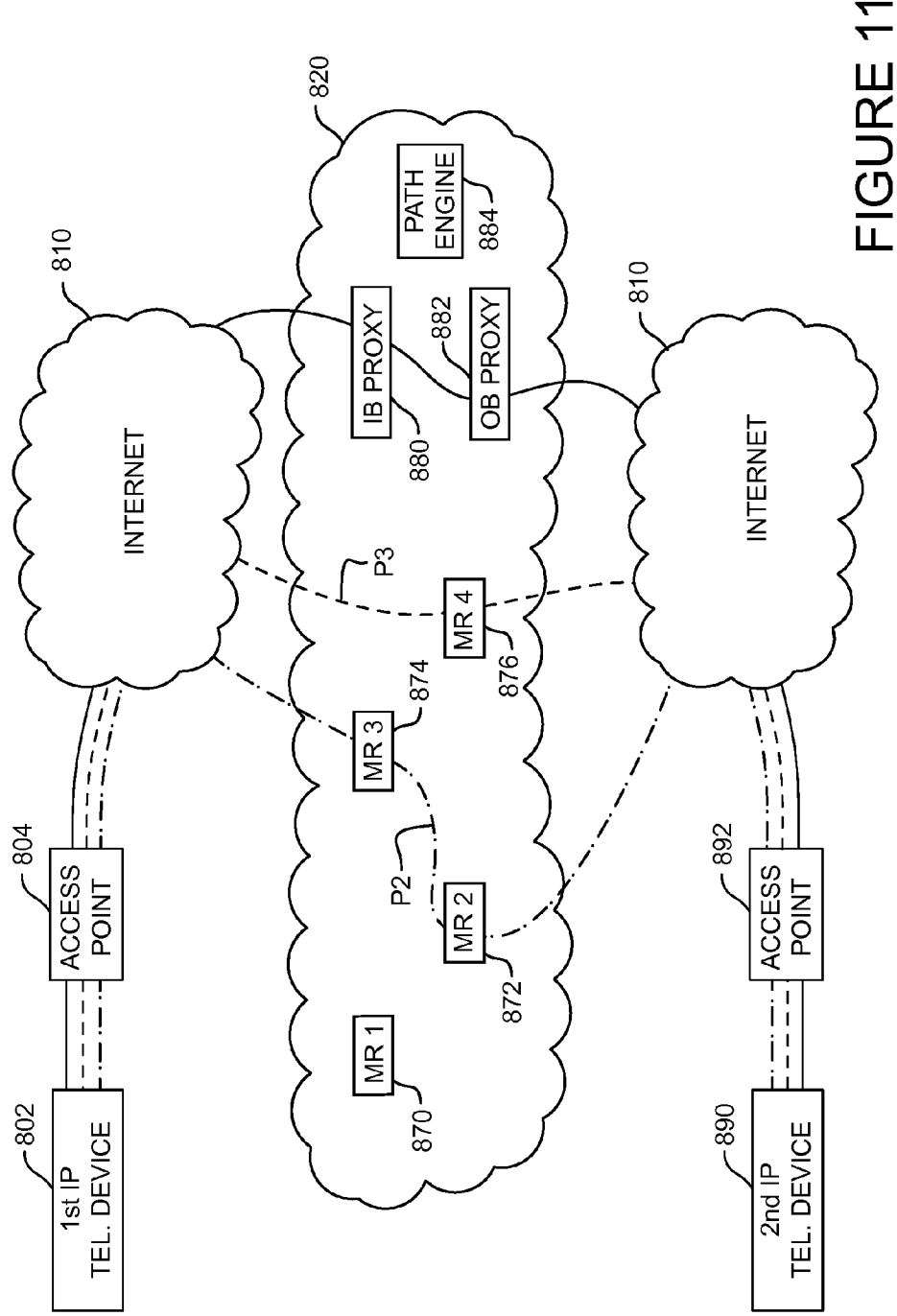
FIG. 11 is a diagram illustrating the paths that can be used to communicate data packets bearing the media of a telephony communication, as well as keep-alive messages.

Once the switch has been made, the conditions illustrated in FIG. 11 would exist. As shown in FIG. 11, data packets bearing the media of the telephony communication are communicated along alternate path P3, which passes through the fourth media relay 876. However, FIG. 11 also illustrates that "keep-alive" messages are also communicated back and forth between the first IP telephony device 802 and the second IP telephony device 890 along the initial path P2. In FIG. 11, keep-alive messages are represented by the lines which include alternating dashes and dots. Keep-alive messages are one of the various messages used in the Session Initiation Protocol (SIP), as defined in ITEF RFC 5626 by Jennings, et al., October 2009.

As is well known to those of ordinary skill in the art, keep-alive messages are periodic messages with essentially no data content which are sent through a communication path to ensure that all elements involved in the communication path remain available and ready for immediate use. In the embodiment illustrated in FIG. 11, by sending keep-alive messages through the initial path P2, initial path P2 remains open and available for immediate use, should it become necessary to switch the telephony communication from the alternate path P3 back to the initial path P2. This may be necessary if the alternate path fails for any reason, or suddenly declines in quality.

Returning to the method illustrated in FIG. 12, the periodic testing steps conducted in step S1218 are performed each time that the predetermined period of time elapses in step S1216, unless, of course, the call is determined to have been terminated in step S1214. Whenever the testing conducted in step S1218 indicates that alternate path provides better quality than the path currently in used, as determined in step S1220, a switch is made to the alternate path offering better quality in step S1212.

For example, if the telephony communication has already been switched from the initial path P2 to the alternate path P3, and performance of the periodic testing step S1218 later indicates that the quality of the initial path P2 has become better than the quality of alternate path P3, the telephony communication would be switched back to the initial path P2. At that point in time, however, keep-alive messages would be communicated through alternate path P3. In some situations, the telephony communication could also be switched from alternate path P3 to a second alternate path, such as path P1. In that instance, keep-alive messages would thereafter be sent along first alternate path P3.

In the method described above and illustrated in FIG. 12, the second IP telephony device 890 conducts an initial round of quality testing, and subsequent periodic rounds of quality testing to determine if an alternate path is offering better quality than the path currently in use. In alternate embodiments, however, those testing steps could be performed by the first IP telephony device 802. Moreover, in yet other alternate embodiments, both the first IP telephony device 802 and the second IP telephony device 890 could both be performing periodic testing, and the results from the testing conducted by both IP telephony devices could be used to determine if an alternate path is offering better quality than the path currently in use. In embodiments where both the first IP telephony device 802 and the second IP telephony device 890 are both conducting periodic testing, the telephony communication may only be moved to an alternate path if both IP telephony devices agree that the alternate path offers better quality than the path currently in use.

In all the methods described above, an IP telephony device conducts quality testing of one or more paths which can be used to conduct a telephony communication. As mentioned above, this call quality testing can be conducted by sending test data packets from the IP telephony device to an element of an IP telephony system, such a media relay. In some instances, the test data packets may be forwarded on to another IP telephony device to determine the quality of the path which extends all the way between first and second IP telephony devices. Response messages are then received back at the IP telephony device that originally sent the test data packets. The response messages are used to determine the quality of a path.

The data packets which are sent as part of the quality testing could be configured to resemble, as closely as possible, the types of data packets which would be sent during an actual telephony communication. In particular, it is advantageous to ensure that at least the headers of the data packets closely resemble data packets that bear the media of a telephony communication to ensure that the test data packets are handled in the same way as data packets bearing the media of a telephony communication. Likewise, it may be advantageous to the test data packets at a data rate which mimics the data rate of data packets bearing the media of a telephony communication, for essentially the same reasons. By formatting and transmitting the test data packets so that they closely resemble the data packets bearing the media of a telephony communication, one can better determine whether an Internet service provider is attempting to throttle transmission of those types of data packets.

Embodiments where the Fastest Path is Selected as the Initial Path, and where Quality Testing is Thereafter Conducted FIGS. 13-16 will now be used to provide a description of yet another alternate embodiment. In this embodiment, when a telephony communication is to be setup between first and second IP telephony devices, the telephony communication is initially sent along one or more paths which provide the fastest initial data transmissions between the first and second IP telephony devices. After the telephony communication begins, quality testing is conducted on the path(s) in use, and any alternate paths which could be used for the telephony communication. If one of the alternate paths offers better quality than an initial path(s), the telephony communication is switched to the alternate path offering higher call quality. As with the embodiment described above, periodic quality testing is performed while the call is ongoing, and whenever an alternate path is determined to offer better quality, the telephony communication is switched to the alternate path offering better quality.

Figure 13:
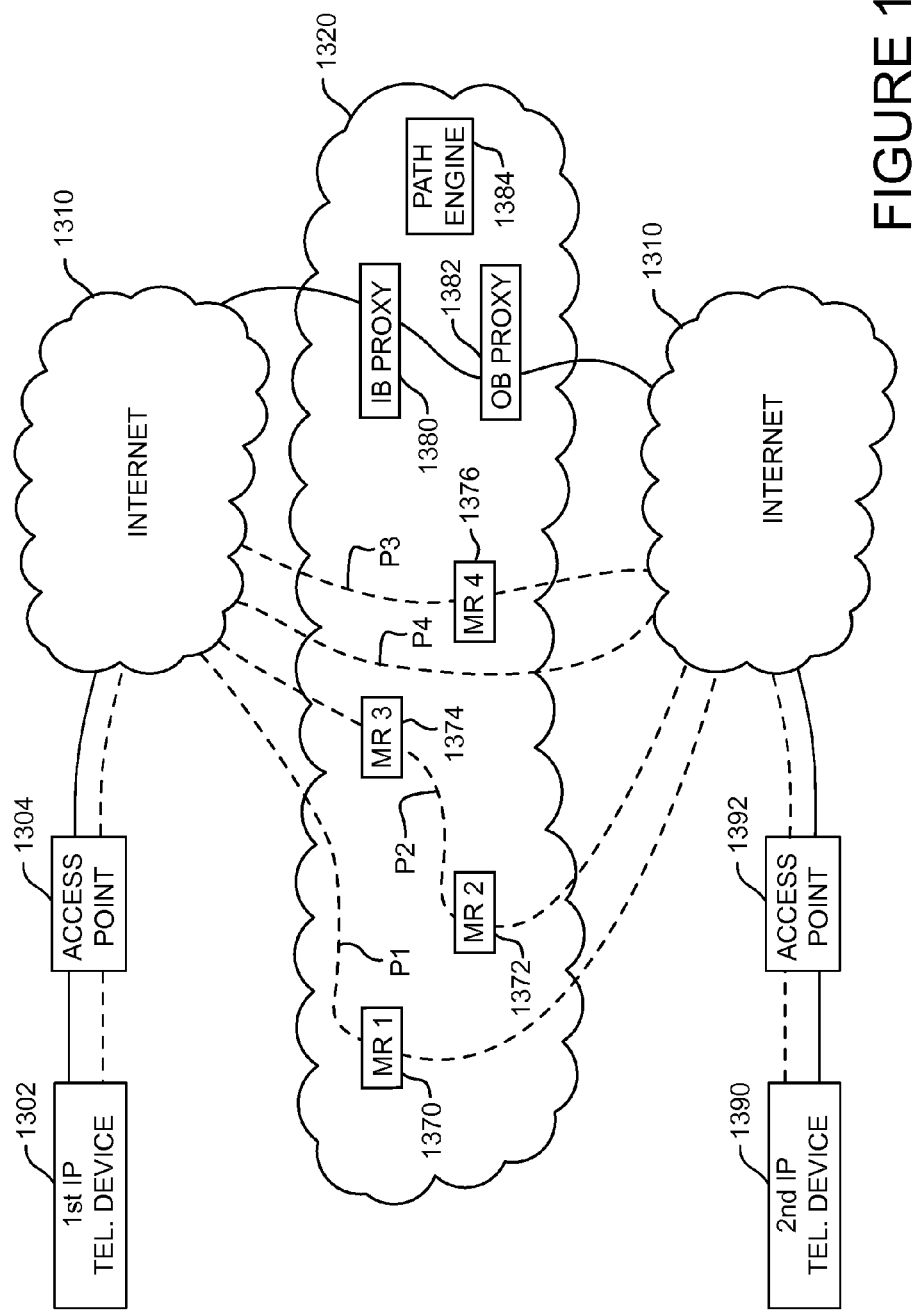
FIG. 13 illustrates the conditions in a communication environment which exist while data packets bearing the media of a telephony communication are transmitted over one path at the same time that data packets are transmitted over alternate paths to test the quality of the alternate paths.

In this embodiment, the first IP telephony device 1302, as illustrated in FIG. 13, sends a request to setup a telephony communication with the second IP telephony device 1390 to an inbound proxy server 1380 of an IP telephony system 1320 via an access point 1304 and the Internet 1310. The inbound proxy server 1380 identifies the outbound proxy server 1382 as able to communicate with the second IP telephony device 1390, and setup signaling is sent to the second IP telephony device 1390 via the outbound proxy server 1382, the Internet 1310 and the access point 1392.

Figure 16:
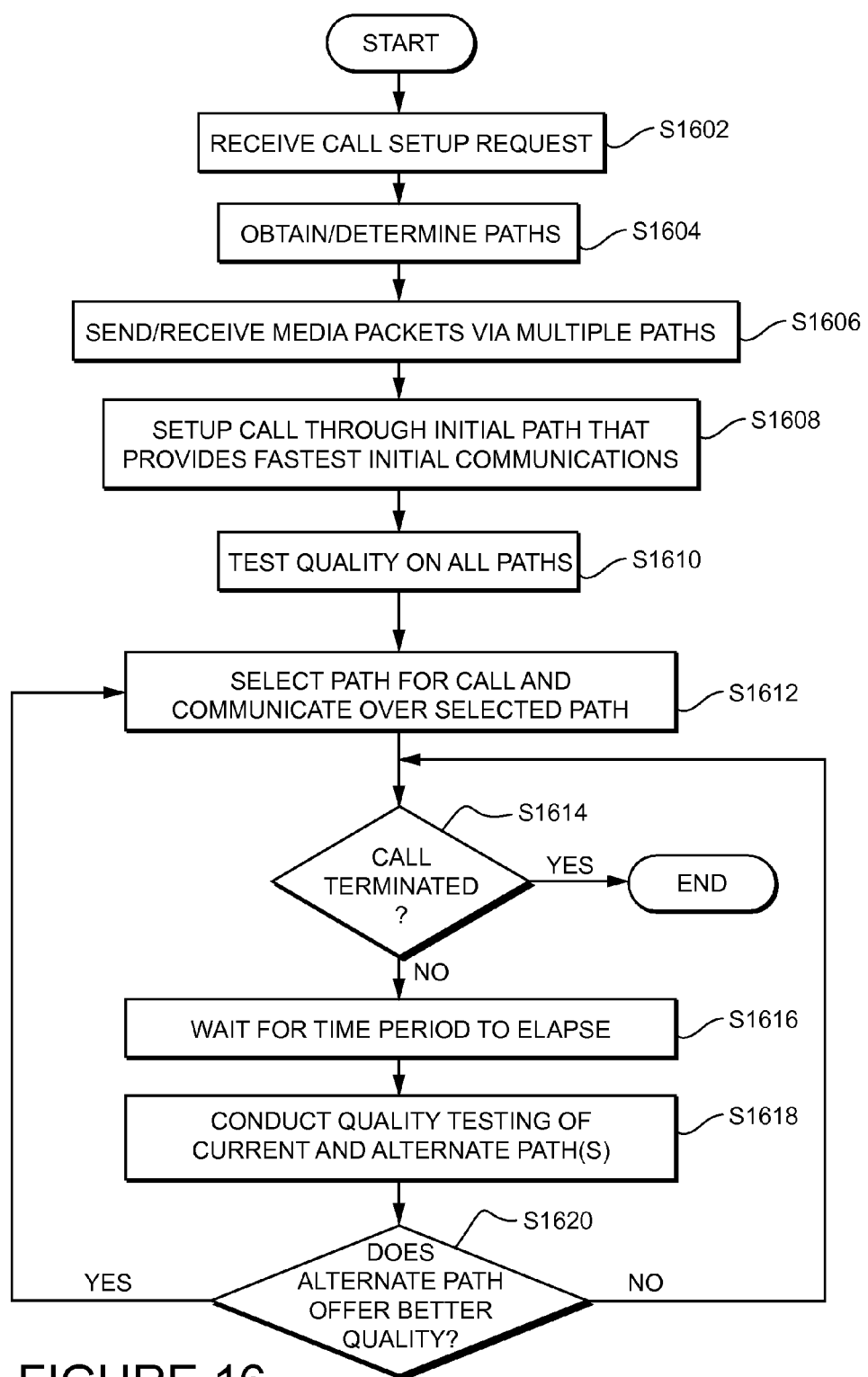
FIG. 16 illustrates steps of a method which may be performed by a telephony device to setup a telephony communication over a first path that offers the fastest initial data transmission speed, to periodically test the quality of multiple paths, and to switch to an alternate path if the alternate path offers better quality.
Figure 17:
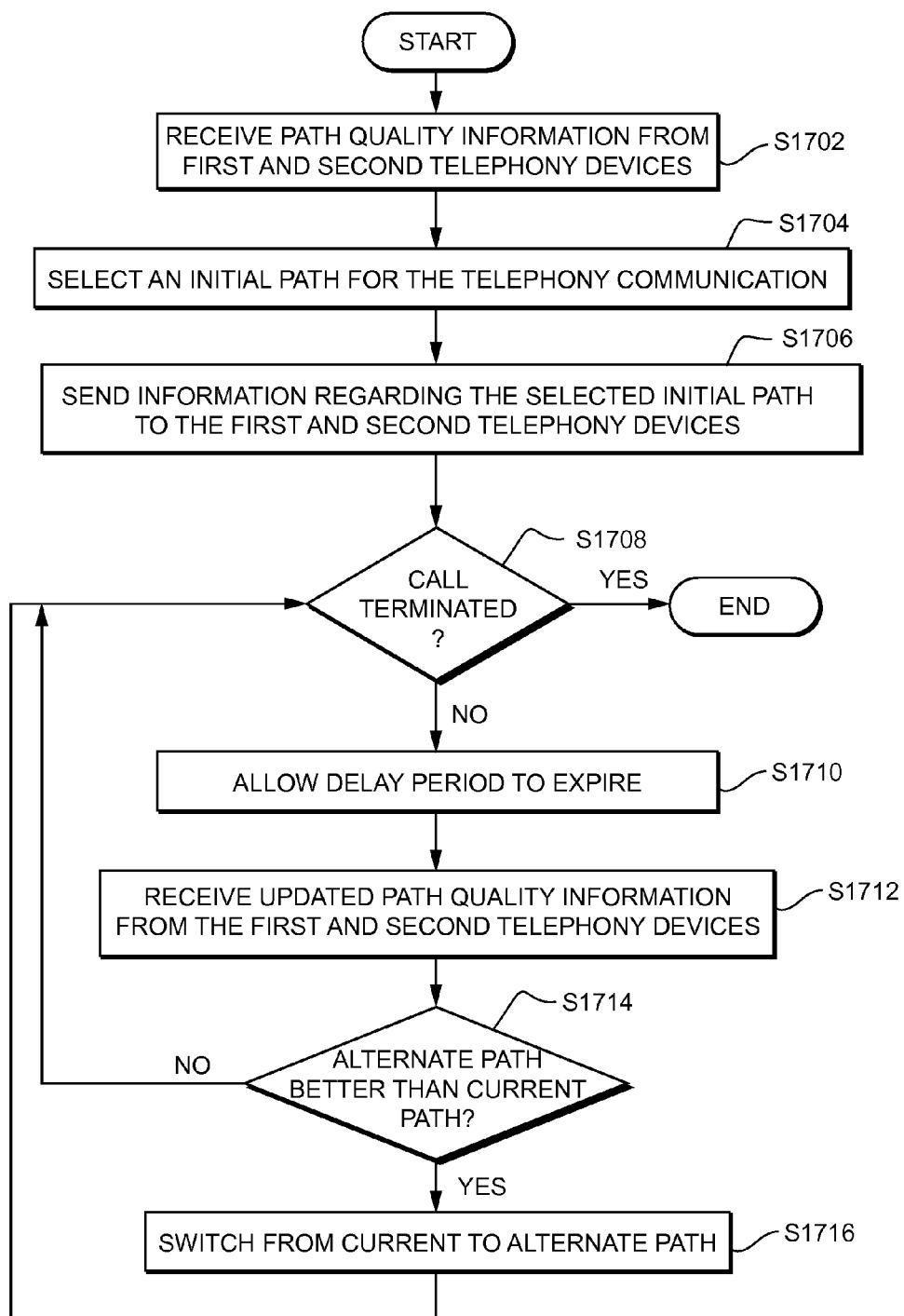
FIG. 17 illustrates steps of a method which may be performed by an element of an IP telephony system to control the path used by first and second telephony devices to conduct a telephony communication.

As illustrated in FIG. 16, the method begins and proceeds to step S1502 when the setup request is received by the second IP telephony device 1390. The method then proceeds to step S1504 where the available communication paths between the first IP telephony device 1302 and the second IP telephony device 1390 are determined. In some embodiments, this determination could be made by the path selection unit 306 of telephony device software 300 on either or both of the first IP telephony device 1302 and the second IP telephony device 1390. In other embodiments, the path engine 1384 of the IP telephony system 1320 could identify the potential paths which are available for the telephony communication, and this information could be sent to the first and second IP telephony devices as part of the setup signaling.

Once the available paths are determined, and both the first IP telephony device 1302 and the second IP telephony device 1390 have been informed of all available communication paths, the method proceeds to step S1506 where the first IP telephony device 1302 and the second IP telephony device 1390 both begin to send data packets bearing the media of the telephony communication in parallel through all available paths. With reference to FIG. 13, this would mean that the first IP telephony device 1302 sends data packets bearing the media of the telephony communication to the second IP telephony device 1390 through path P1 which passes through the first media relay 1370, through path P2 passing through the second media relay 1372 and the third media relay 1374, through path P3, which passes through the fourth media relay 1376, and through path P4, which passes directly between the first IP telephony device 1302 and the second IP telephony device 1390. At the same time, the second IP telephony device 1390 sends data packets bearing the media of the telephony communication to the first IP telephony device 1302 in parallel through all of the same paths.

In step 1508, the first IP telephony device 1302 determines which of the available paths delivered data packets from the second IP telephony device 1390 the fastest. The first IP telephony device 1302 then informs the second IP telephony device 1390 of which path was fastest. In some embodiments in the invention, this path would then be used as the initial path for the telephony communication.

In alternate embodiments, the second IP telephony device 1390 determines which of the paths delivered the data packets sent from the first IP telephony device 1302 the fastest. The second IP telephony device 1390 then informs the first IP telephony device 1302 of which path was the fastest. In these embodiments, the telephony communication would begin with the first IP telephony device 1302 sending its data packets bearing the media of the telephony communication to the second IP telephony device 1390 over the fastest path for sending data packets in that direction. Likewise, the second IP telephony device 1390 sends its data packets bearing the media of the telephony communication to the first IP telephony device 1302 over the path offering the fastest transmissions in that direction. As a result, the first IP telephony device 1302 may end up sending its data packets over a different communication path than the second IP telephony device 1390.

Figure 14:
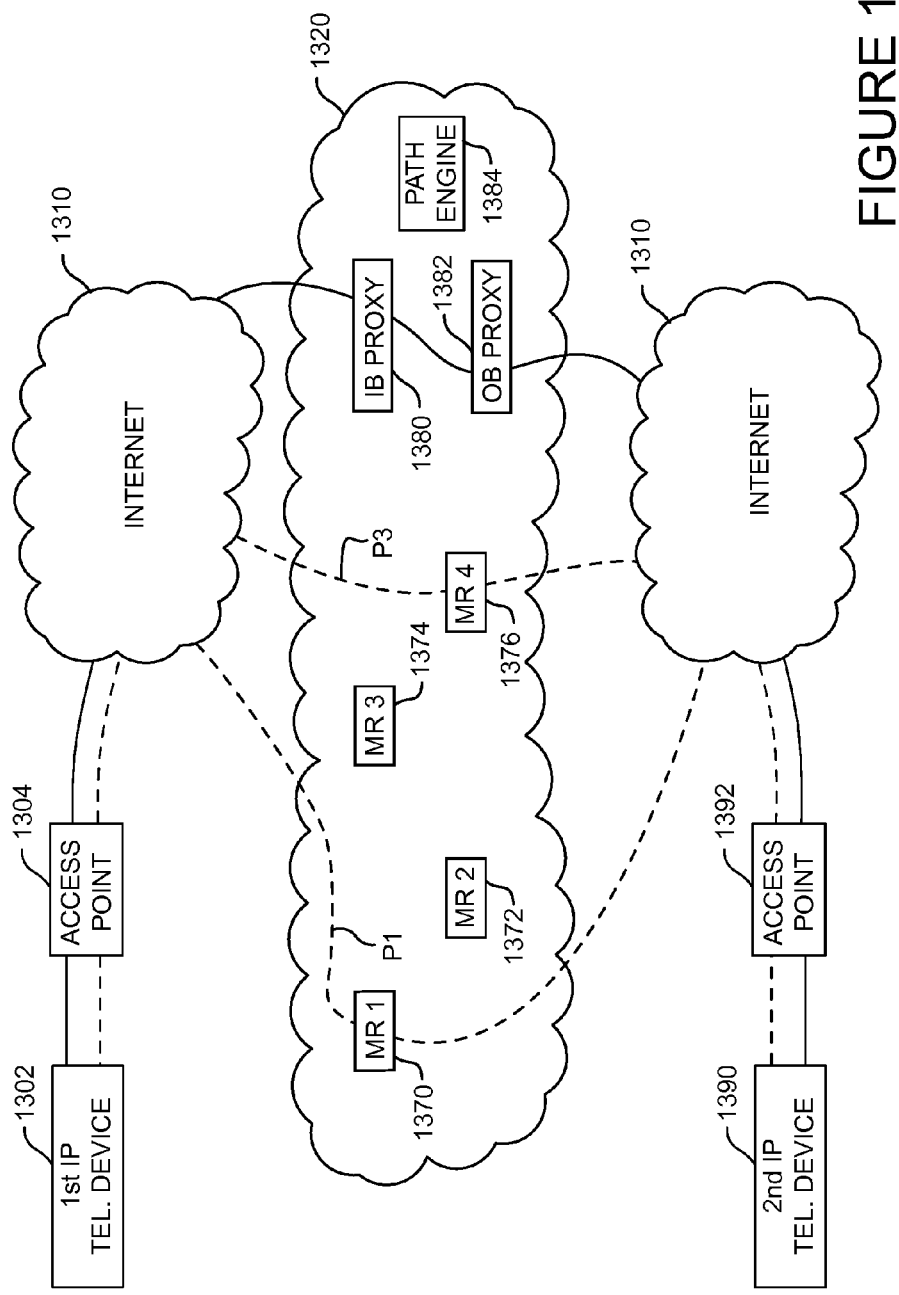
FIG. 14 is a diagram illustrating how data packets bearing the media of a telephony communication may be sent between two telephony devices via first and second paths.

FIG. 14 illustrates a situation where the first IP telephony device 1302 begins the telephony communication by sending its data packets to the second IP telephony device 1390 via path P1, which passes through the first media relay 1370. At the same time, the second IP telephony device 1390 begins the telephony communication by sending its data packets to the first IP telephony device 1302 via path P3, which passes through the fourth media relay 1376. As a result, during the initial stages of the telephony communication, the data packets being sent from each of the first and second telephony devices are traversing different paths.

The method then proceeds to step S1510 where the quality of all available paths are tested. This testing step would be conducted in a fashion similar to the testing steps described above. Specifically, the testing step could involve one or both of the IP telephony devices conducting quality testing through all the available paths. Once the testing has been conducted, the test result would be examined and a single path would be selected for use in continuing the telephony communication. However, if two different paths have been used during the initial stages, as illustrated in FIG. 14, and one of those two paths is selected to continue the telephony communication, keep-alive messages would be sent through the path which is no longer being used.

Figure 15:
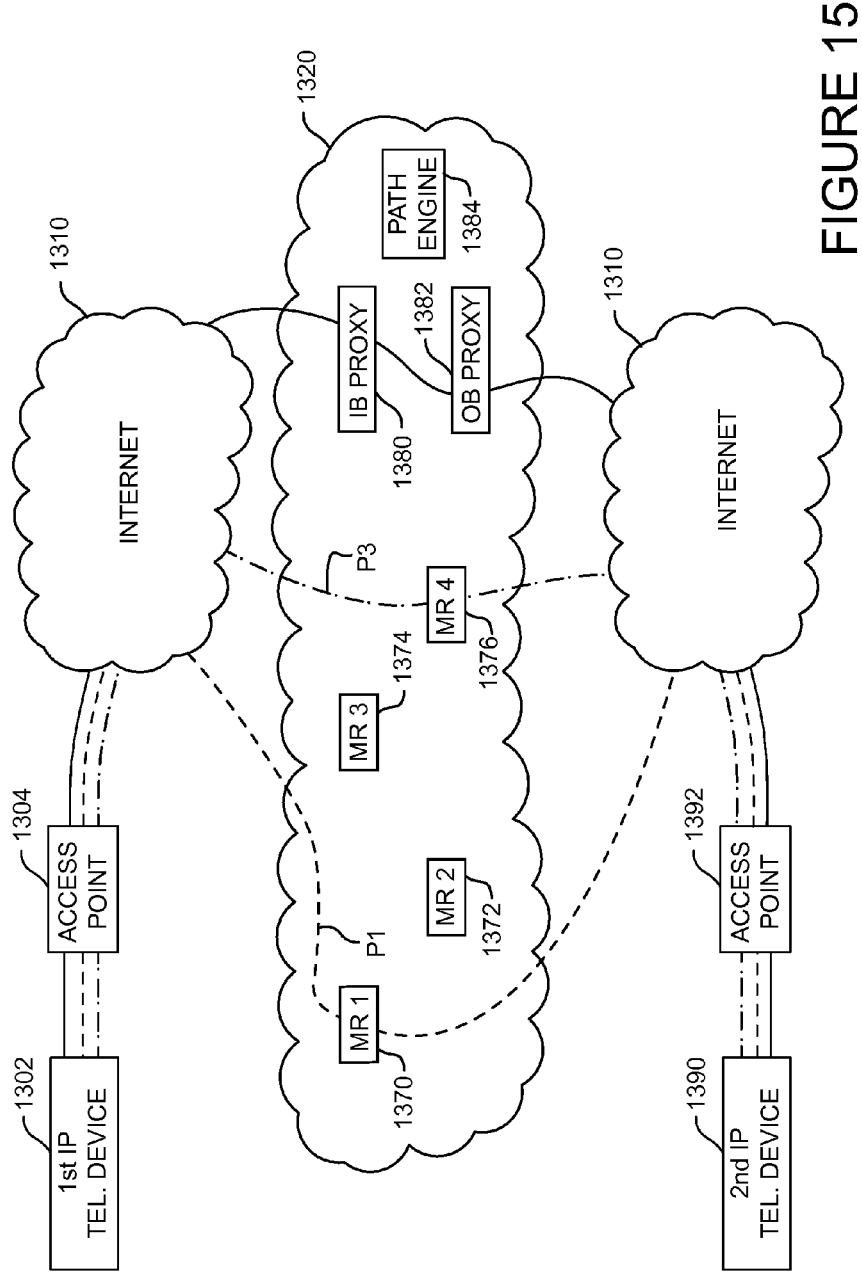
FIG. 15 is a diagram illustrating how data packets bearing the media of a telephony communication are communicated over only a single path, while keep-alive messages are sent over an alternate path.

If the first path P1 is selected to continue the telephony communication in step S1512, both the first and second IP telephony devices would begin to use path P1 to continue the telephony communication, and the result would be as illustrated in FIG. 15. Note, keep-alive messages are communicated between the first and second telephony devices along path P3, which was also used during the initial stages of the telephony communication.

The method then proceeds to step S1514, where check is made to determine if the call it has been terminated. If not, the method proceeds to step S1516, and a delay period is allowed to expire. The method then proceeds to step S1518, where another round of quality testing is conducted on both the current path, and any available alternate paths. The method then proceeds to step S1520, where a determination is made as to whether any of the alternate paths offer better quality than the current path. If not, the method loops back to step S1516. If so, the method loops to step S1512 and the first and second IP telephony devices being using the alternate path offering better quality. The switch to the alternate path could be conducted as explained above. Also, when a switch is made to the alternate path offering better call quality, the first and second telephony devices would communicate keep-alive messages through the path which is no longer being used. These method steps would continue until the check in step S1514 indicates that the call has been terminated.

In many of the foregoing descriptions, a software application running on a telephony device performs various functions. In alternate embodiments, a browser running on the telephony device may access a software application that is running on some other device via a data network connection. For example, the software application could be running on a remote server that is accessible via a data network connection. The software application running elsewhere, and accessible via a browser on the telephony device may provide all of the same functionality as an application running on the telephony device itself. Thus, any references in the foregoing description and the following claims to an application running on a telephony device are intended to also encompass embodiments and implementations where a browser running on a telephony device accesses a software application running elsewhere via a data network.

In the embodiments discussed above, a first IP telephony device is seeking to setup a telephony communication with a second IP telephony device. However, the systems and methods described above are equally applicable to situations where a first IP telephony device is attempting to setup a telephony communication with an analog or cellular telephone. In those instances, the first IP telephony device would be sending data packets bearing the media of the telephony communication to a gateway or another similar device which acts as an interface between an IP telephony system and the PSTN or a cellular network. However, the media relays discussed above could still be used to communicate data packets bearing the media of the telephony communication between the interface gateway and the first IP telephony device. Thus, most of the methods described above could also be used to facilitate the selection and use of particular communication paths in this situation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method performed by a first telephony device for conducting an Internet protocol (IP) telephony communication with a second telephony device via a data network, wherein the IP telephony communication is routed, at least initially, through an element of a data network that is in communication with the second telephony device, comprising:

receiving a setup request at the first telephony device, the setup request indicating that an IP telephony communication is to be established between the first telephony device and the second telephony device;

sending a first stream of data packets bearing the media of the telephony communication from the first telephony device to the element of the data network that is in communication with the second telephony device via a first path through the data network;

sending a second stream of data packets bearing the media of the telephony communication from the first telephony device to the element of the data network in communication with the second telephony device via a second path through the data network, wherein the second stream of data packets is sent via the second path at substantially the same time that the first stream of data packets is sent via the first path;

determining which of the first and second paths was the fastest to initially communicate a stream of data packets bearing the media of the telephony communication to the element of the data network in communication with the second telephony device; and conducting an initial stage of the telephony communication by sending data packets bearing the media of the telephony communication to the element of the data network in communication with the second telephony device via the path which was the fastest to initially communicate data packets to the element of the data network in communication with the second telephony device.

2. The method of claim 1, further comprising sending keep alive messages to the element of the data network in communication with the second telephony device via the path which was slowest to initially communicate a stream of data packets bearing the media of the telephony communication to the element of the data network in communication with the second telephony device.

3. The method of claim 1, further comprising:
conducting an initial test of a quality of the first and second paths while the initial stage of the telephony communication is being conducted; and
conducting an intermediate stage of the telephony communication which occurs after the initial stage by sending data packets bearing the media of the telephony communication to the element of the data network in communication with the second telephony device via the path which is determined, during the initial testing step, to have the highest quality.

4. The method of claim 3, wherein while the intermediate stage of the telephony communication is being conducted, the method further comprises sending keep alive messages to the element of the data network in communication with the second telephony device via the path which is determined to have the next-highest quality compared to the path having the highest quality.

5. The method of claim 3, further comprising:
conducting periodic tests of the quality of the path currently in use, and at least one alternate path after the intermediate stage of the telephony communication has begun and while the telephony communication is ongoing; and
continuing the telephony communication, after each periodic test, by sending data packets bearing the media of the telephony communication to the element of the data network in communication with the second telephony device via the path which is determined to have the highest quality during the preceding periodic test.

6. The method of claim 5, wherein the method further comprises sending, after each periodic test, keep alive messages to the element of the data network in communication with the second telephony device via the path which is determined to have the next-highest quality, compared to the path having the highest quality, during the preceding periodic test.

7. The method of claim 1, further comprising:
conducting periodic tests of the quality of the first and second paths after the initial stage of the telephony communication has begun and while the telephony communication is ongoing; and
continuing the telephony communication, after each periodic test, by sending data packets bearing the media of the telephony communication to the element of the data network in communication with the second telephony device via the path which is determined to have the highest quality during the preceding periodic test.

8. The method of claim 7, wherein the method further comprises sending, after each periodic test, keep alive messages to the element of the data network in communication with the second telephony device via the path which is determined to have the next-highest quality, compared to the path having the highest quality, during the preceding periodic test.

9. The method of claim 1, wherein the element of the data network in communication with the second telephony device is at least one of a media relay, a proxy server, a gateway and a session border controller.

10. The method of claim 1, wherein the setup request identifies the first and second paths.

11. The method of claim 1, wherein the first telephony device selects the first and second paths.

12. The method of claim 1, wherein the first telephony device consults a path engine of an IP telephony system to request identification of the first and second paths.

13. The method of claim 1, wherein the second path includes a media relay which is not part of the first path.

14. The method of claim 1, further comprising:
conducting periodic tests of a quality of both the path currently being used and at least one alternate path that could be used to communicate data packets bearing the media of the telephony communication to the element of the data network in communication with the second telephony device after the initial stage of the telephony communication has begun and while the telephony communication is ongoing; and
continuing the telephony communication, after each periodic test, by sending data packets bearing the media of the telephony communication to the element of the data network in communication with the second telephony device via the path which is determined to have the highest quality during the preceding periodic test.

15. A first telephony device that is configured to conduct an Internet protocol (IP) telephony communication with a second telephony device via a data network, wherein the IP telephony communication is routed, at least initially, through an element of a data network that is in communication with the second telephony device, comprising:
means for receiving a setup request at the first telephony device, the setup request indicating that an IP telephony communication is to be established between the first telephony device and the second telephony device;
means for sending a first stream of data packets bearing the media of the telephony communication from the first telephony device to the element of the data network that is in communication with the second telephony device via a first path through the data network;
means for sending a second stream of data packets bearing the media of the telephony communication from the first telephony device to the element of the data network in communication with the second telephony device via a second path through the data network, wherein the second stream of data packets is sent via the second path at substantially the same time that the first stream of data packets is sent via the first path;

means for determining which of the first and second paths was the fastest to initially communicate a stream of data packets bearing the media of the telephony communication to the element of the data network in communication with the second telephony device; and means for conducting an initial stage of the telephony communication by sending data packets bearing the media of the telephony communication to the element of the data network in communication with the second telephony device via the path which was the fastest to initially communicate data packets to the element of the data network in communication with the second telephony device.

16. A non-transitory computer readable medium bearing instructions which, when performed by one or more processors of a first telephony device cause the first telephony device to conduct an Internet protocol (IP) telephony communication with a second telephony device via a data network, wherein the IP telephony communication is routed, at least initially, through an element of a data network that is in communication with the second telephony device, wherein the instructions cause the one or more processors of the first telephony device to perform a method comprising:

receiving a setup request at the first telephony device, the setup request indicating that an IP telephony communication is to be established between the first telephony device and the second telephony device;

sending a first stream of data packets bearing the media of the telephony communication from the first telephony device to the element of the data network that is in communication with the second telephony device via a first path through the data network;

sending a second stream of data packets bearing the media of the telephony communication from the first telephony device to the element of the data network in communication with the second telephony device via a second path through the data network, wherein the second stream of data packets is sent via the second path at substantially the same time that the first stream of data packets is sent via the first path;

determining which of the first and second paths was the fastest to initially communicate a stream of data packets bearing the media of the telephony communication to the element of the data network in communication with the second telephony device; and conducting an initial stage of the telephony communication by sending data packets bearing the media of the telephony communication to the element of the data network in communication with the second telephony device via the path which was the fastest to initially communicate data packets to the element of the data network in communication with the second telephony device.

17. The non-transitory computer readable medium of claim 16, wherein the method performed by the one or more processors of the first telephony device further comprises sending keep alive messages to the element of the data network in communication with the second telephony device via the path which was slowest to initially communicate a stream of data packets bearing the media of the telephony communication to the element of the data network in communication with the second telephony device.

18. The non-transitory computer readable medium of claim 16, wherein the method performed by the one or more processors of the first telephony device further comprises:

conducting an initial test of a quality of the first and second paths while the initial stage of the telephony communication is being conducted; and conducting an intermediate stage of the telephony communication which occurs after the initial stage by sending data packets bearing the media of the telephony communication to the element of the data network in communication with the second telephony device via the path which is determined, during the initial testing step, to have the highest quality.

19. The non-transitory computer readable medium of claim 18, wherein while the intermediate stage of the telephony communication is being conducted, the method performed by the one or more processors of the first telephony device further comprises sending keep alive messages to the element of the data network in communication with the second telephony device via the path which is determined to have the next-highest quality compared to the path having the highest quality.

20. The non-transitory computer readable medium of claim 18, wherein the method performed by the one or more processors of the first telephony device further comprises:

conducting periodic tests of the quality of the path currently in use, and at least one alternate path after the intermediate stage of the telephony communication has begun and while the telephony communication is ongoing; and continuing the telephony communication, after each periodic test, by sending data packets bearing the media of the telephony communication to the element of the data network in communication with the second telephony device via the path which is determined to have the highest quality during the preceding periodic test.

21. The non-transitory computer readable medium of claim 20, wherein the method performed by the one or more processors of the first telephony device further comprises sending, after each periodic test, keep alive messages to the element of the data network in communication with the second telephony device via the path which is determined to have the next-highest quality, compared to the path having the highest quality, during the preceding periodic test.

22. The non-transitory computer readable medium of claim 16, wherein the method performed by the one or more processors of the first telephony device further comprises:

conducting periodic tests of the quality of the first and second paths after the initial stage of the telephony communication has begun and while the telephony communication is ongoing; and continuing the telephony communication, after each periodic test, by sending data packets bearing the media of the telephony communication to the element of the data network in communication with the second telephony device via the path which is determined to have the highest quality during the preceding periodic test.

23. The non-transitory computer readable medium of claim 22, wherein the method further comprises sending, after each periodic test, keep alive messages to the element of the data network in communication with the second telephony device via the path which is determined to have the next-lowest quality, compared to the path having the highest quality, during the preceding periodic test.

24. The non-transitory computer readable medium of claim 16, wherein the element of the data network in communication with the second telephony device is at least one of a media relay, a proxy server, a gateway and a session border controller.

25. The non-transitory computer readable medium of claim 16, wherein receiving a setup request comprises receiving a setup request that identifies the first and second paths.

26. The non-transitory computer readable medium of claim 16, wherein sending a first stream of data packets comprises sending the first stream of data packets via a first path selected by the first telephony device, and wherein sending a second stream of data packets comprises sending the second stream of data packets via a second path selected by the first telephony device 27. The non-transitory computer readable medium of claim 16, wherein the method performed by the one or more processors of the first telephony device further comprises consulting a path engine of an IP telephony system to request identification of the first and second paths.

28. The non-transitory computer readable medium of claim 16, wherein the second path includes a media relay which is not part of the first path.

29. The non-transitory computer readable medium of claim 16, wherein the method performed by the one or more processors of the first telephony device further comprises:
conducting periodic tests of a quality of both the path currently being used and at least one alternate path that could be used to communicate data packets bearing the media of the telephony communication to the element of the data network in communication with the second telephony device after the initial stage of the telephony communication has begun and while the telephony communication is ongoing; and
continuing the telephony communication, after each periodic test, by sending data packets bearing the media of the telephony communication to the element of the data network in communication with the second telephony device via the path which is determined to have the highest quality during the preceding periodic test.

* * * * *